June 29, 1965   J. C. HAMPSON   3,191,636
METHOD OF FORMING A SINUOUS SPRING STRIP
Original Filed June 12, 1956   23 Sheets-Sheet 5

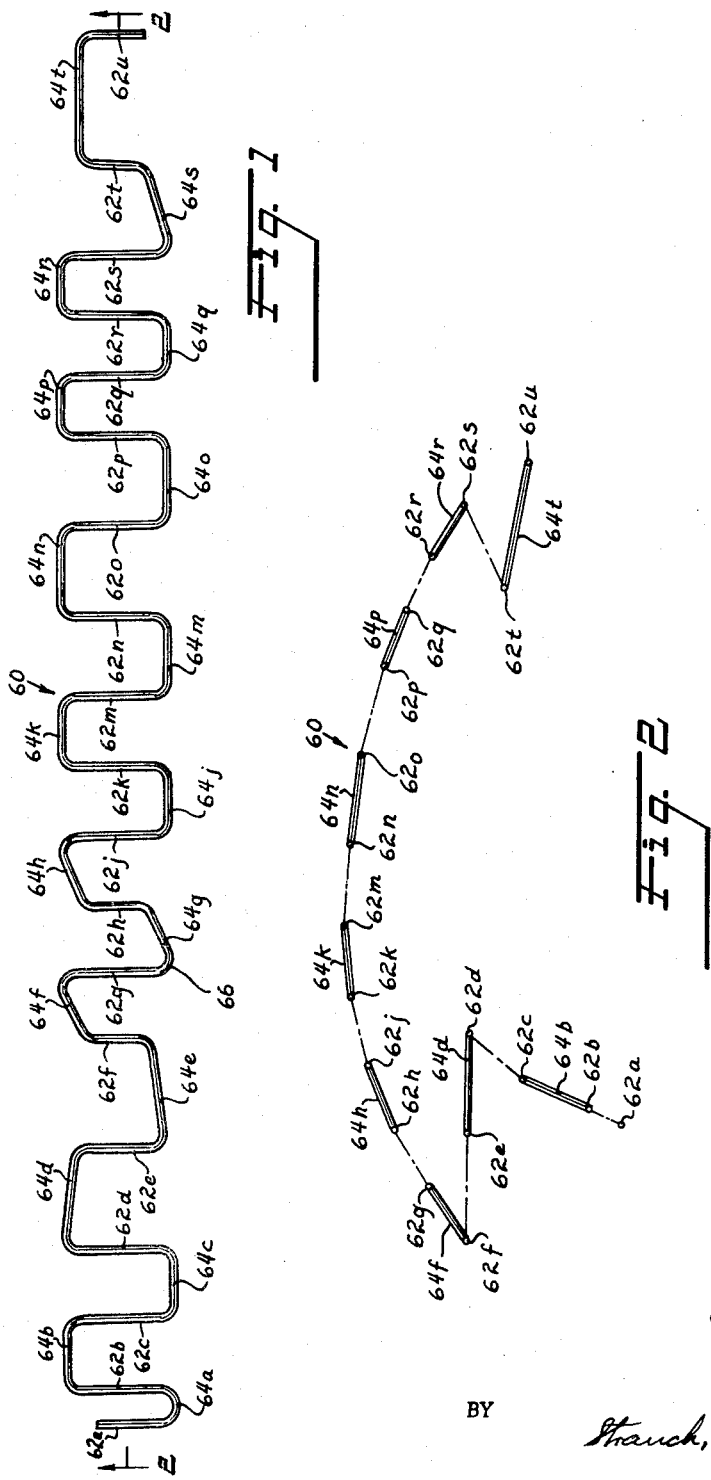

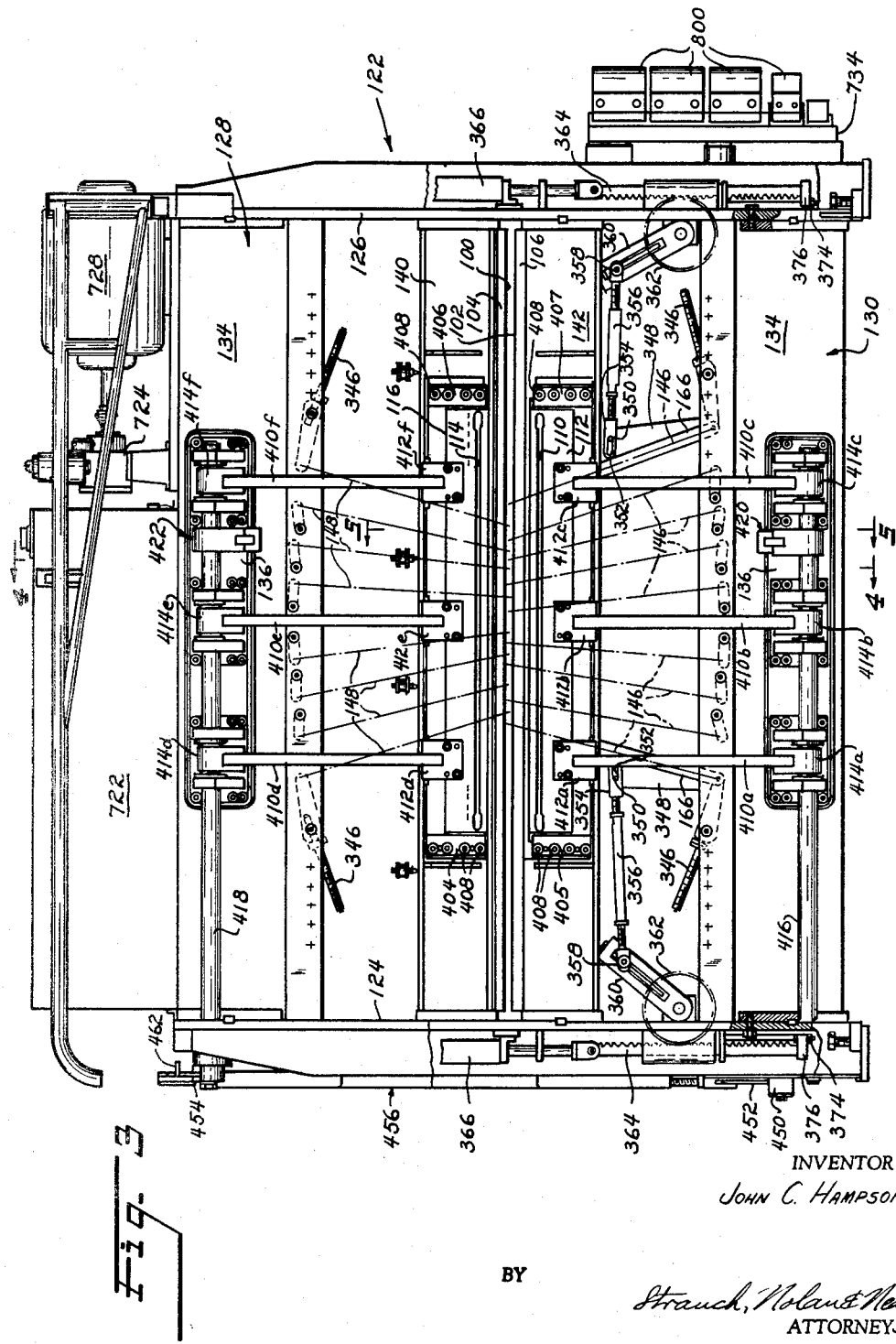

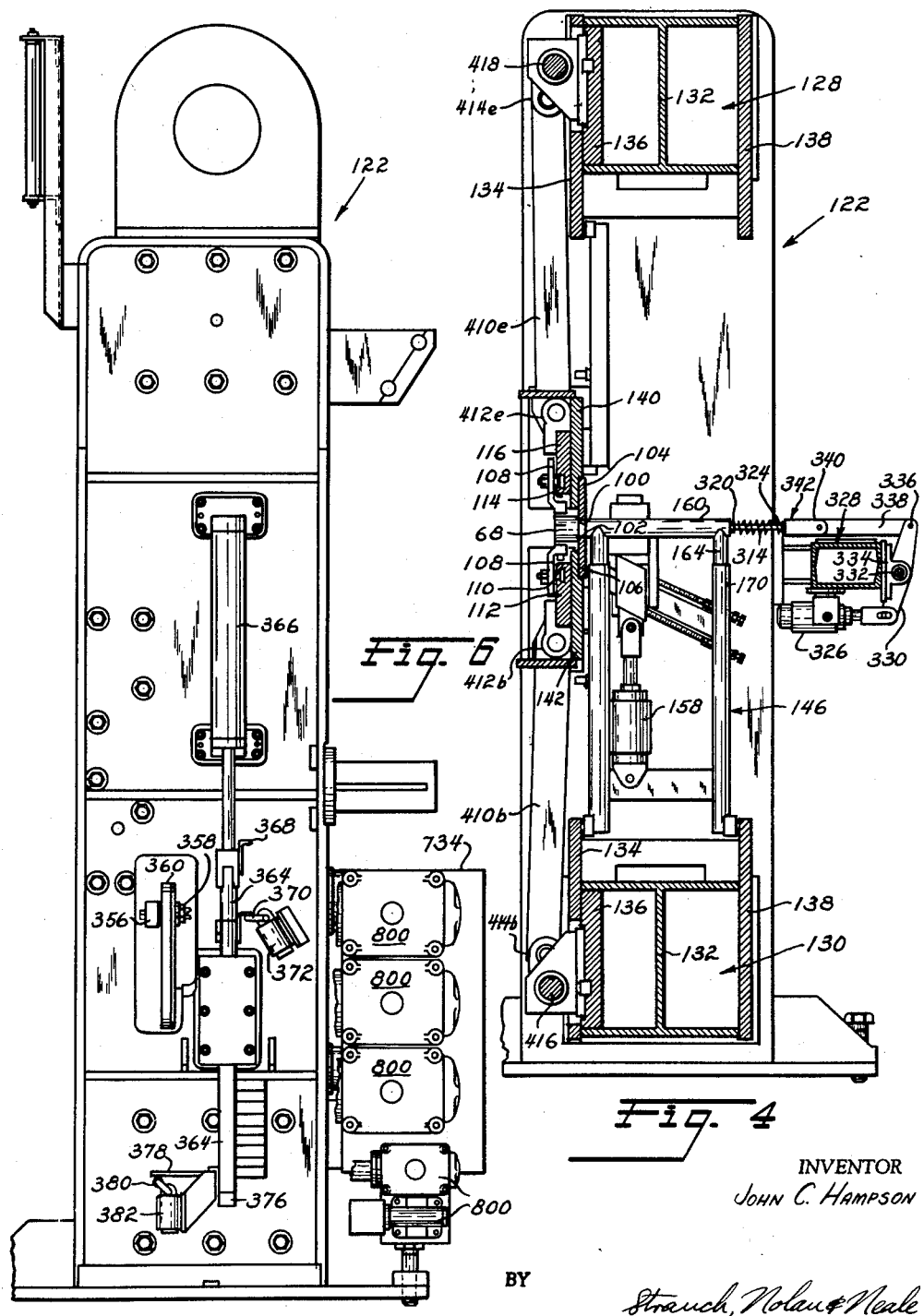

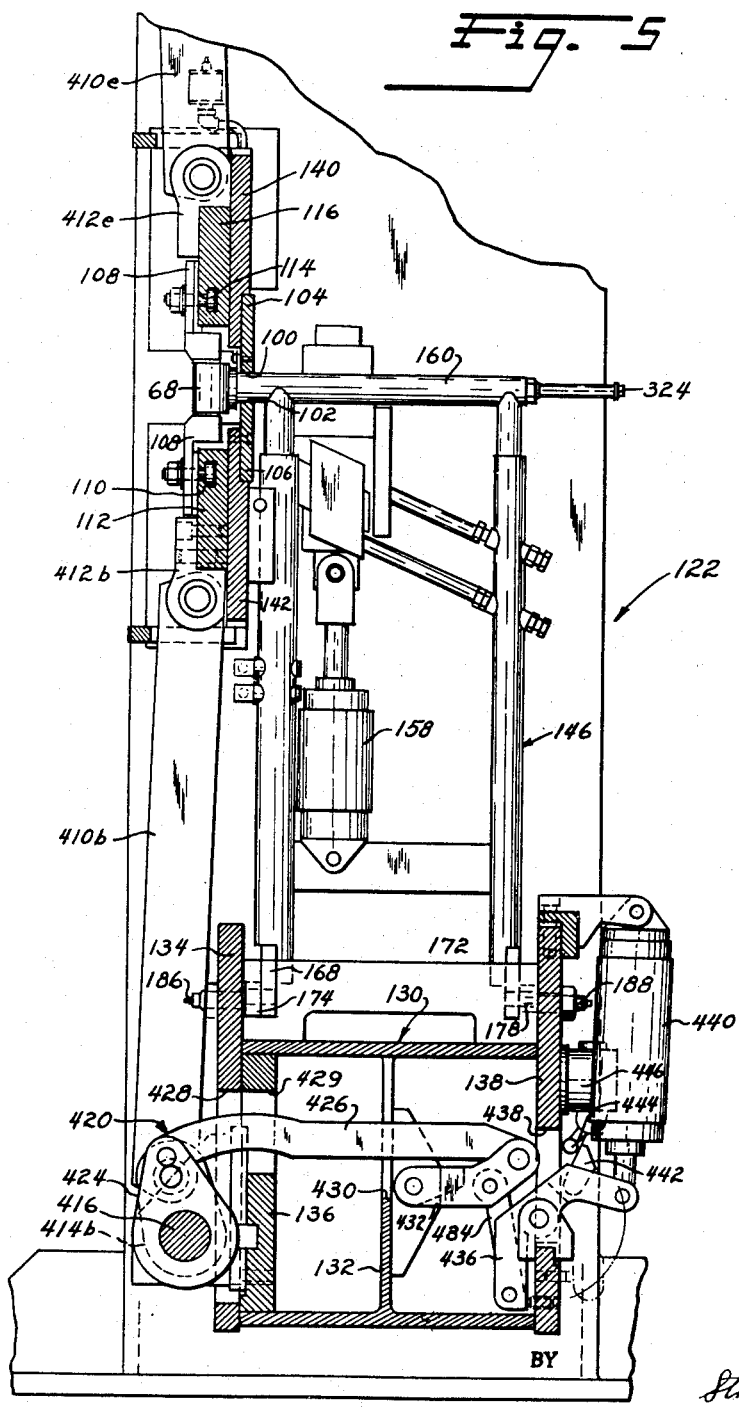

INVENTOR
John C. Hampson
BY
Strauch, Nolan & Neale
ATTORNEYS

June 29, 1965  J. C. HAMPSON  3,191,636
METHOD OF FORMING A SINUOUS SPRING STRIP
Original Filed June 12, 1956  23 Sheets-Sheet 6
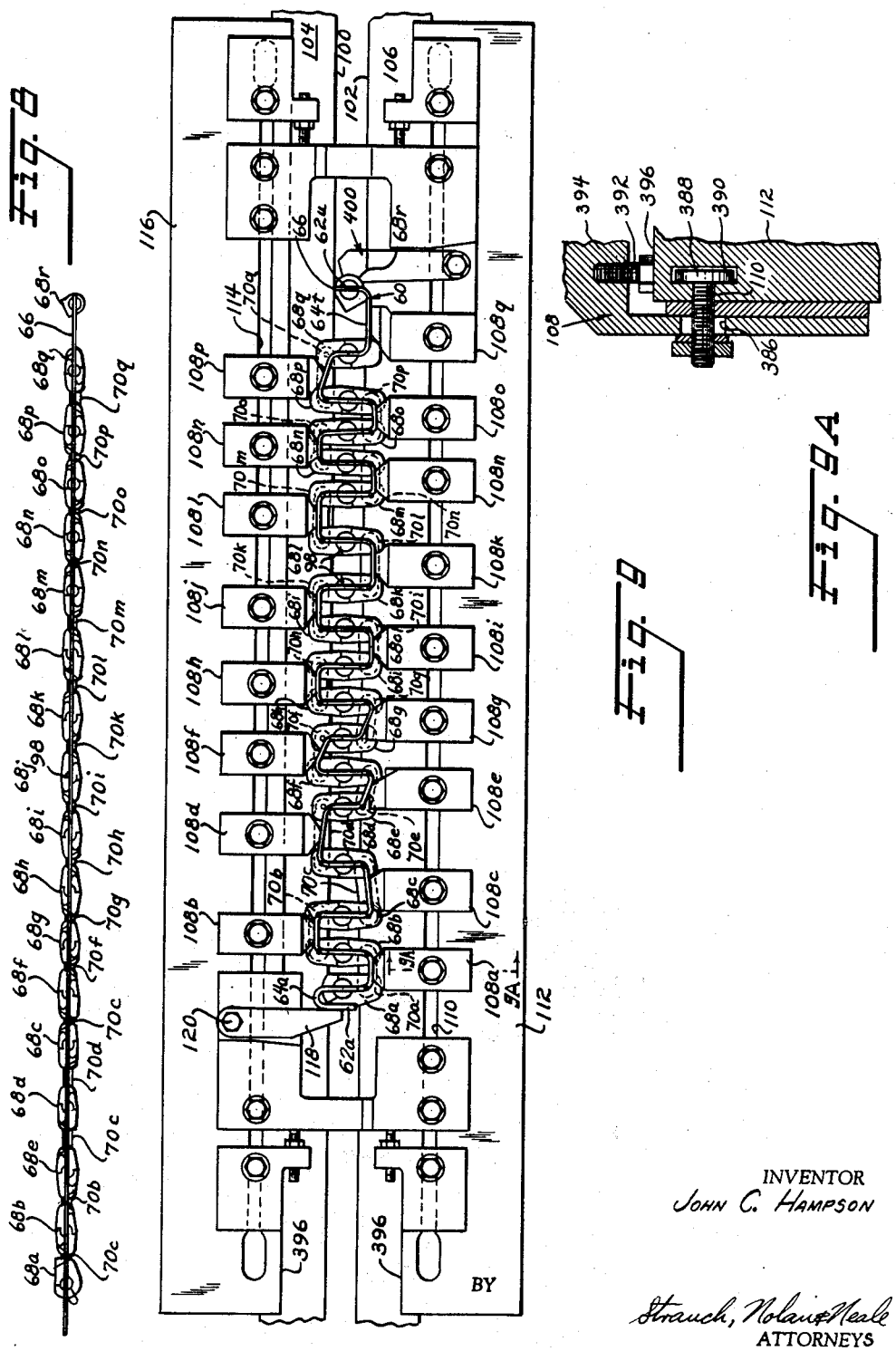
INVENTOR
JOHN C. HAMPSON
BY
Strauch, Nolan & Neale
ATTORNEYS

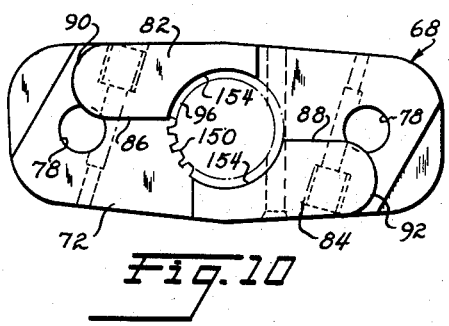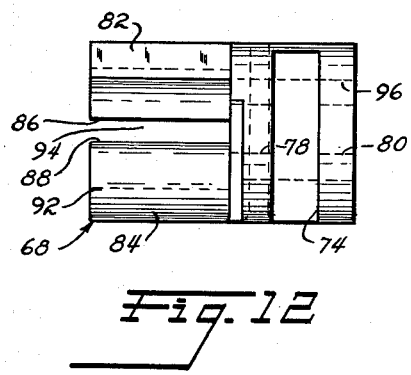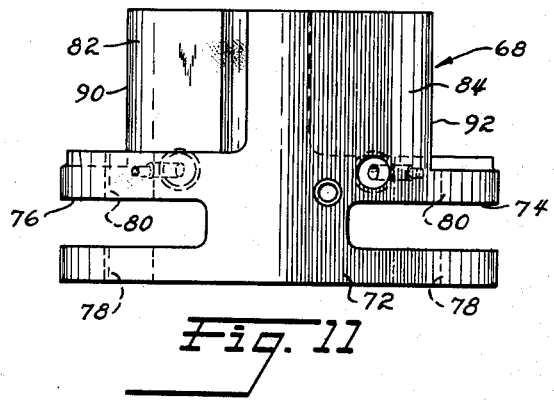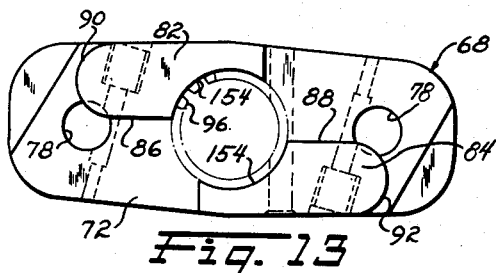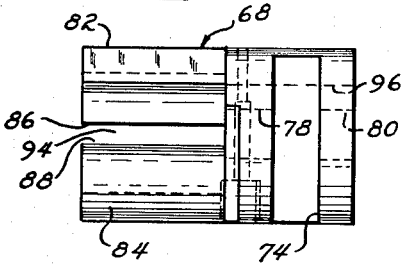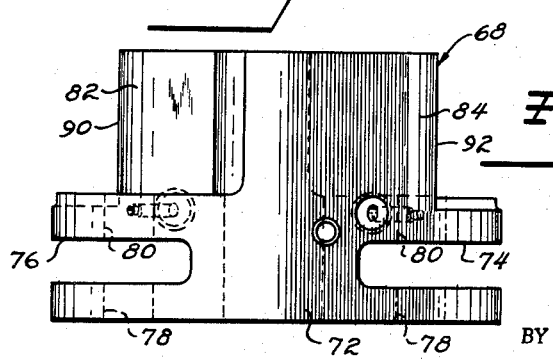

June 29, 1965  J. C. HAMPSON  3,191,636
METHOD OF FORMING A SINUOUS SPRING STRIP
Original Filed June 12, 1956  23 Sheets-Sheet 8
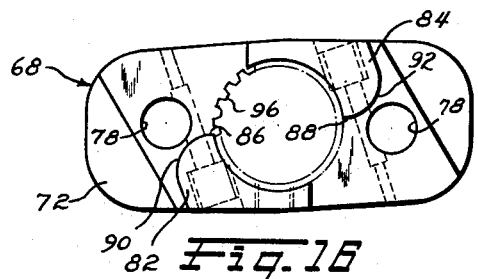
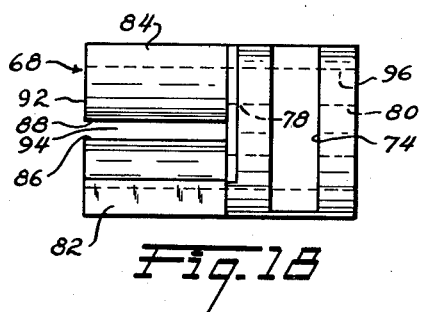
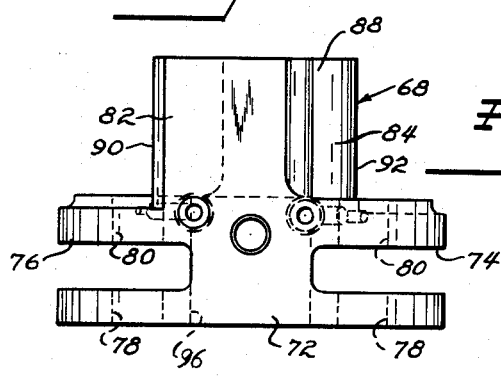
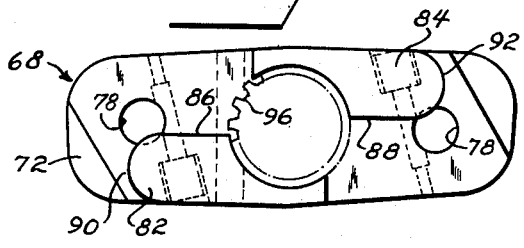
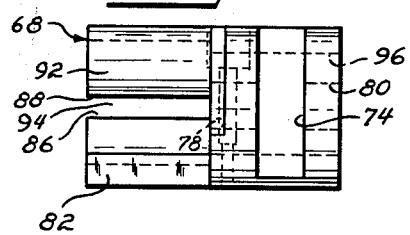
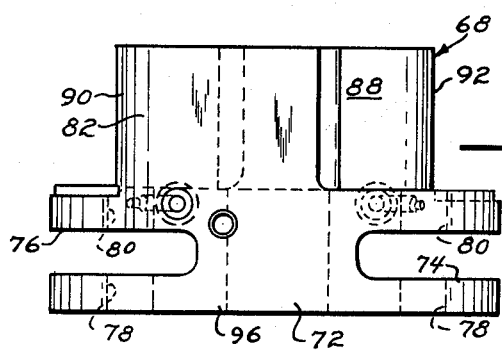
INVENTOR
John C. Hampson
BY
Strauch, Nolan & Neale
ATTORNEYS June 29, 1965 J. C. HAMPSON 3,191,636
METHOD OF FORMING A SINUOUS SPRING STRIP
Original Filed June 12, 1956 23 Sheets-Sheet 9

INVENTOR
John C. Hampson
BY
Strauch, Nolan & Neale
ATTORNEYS

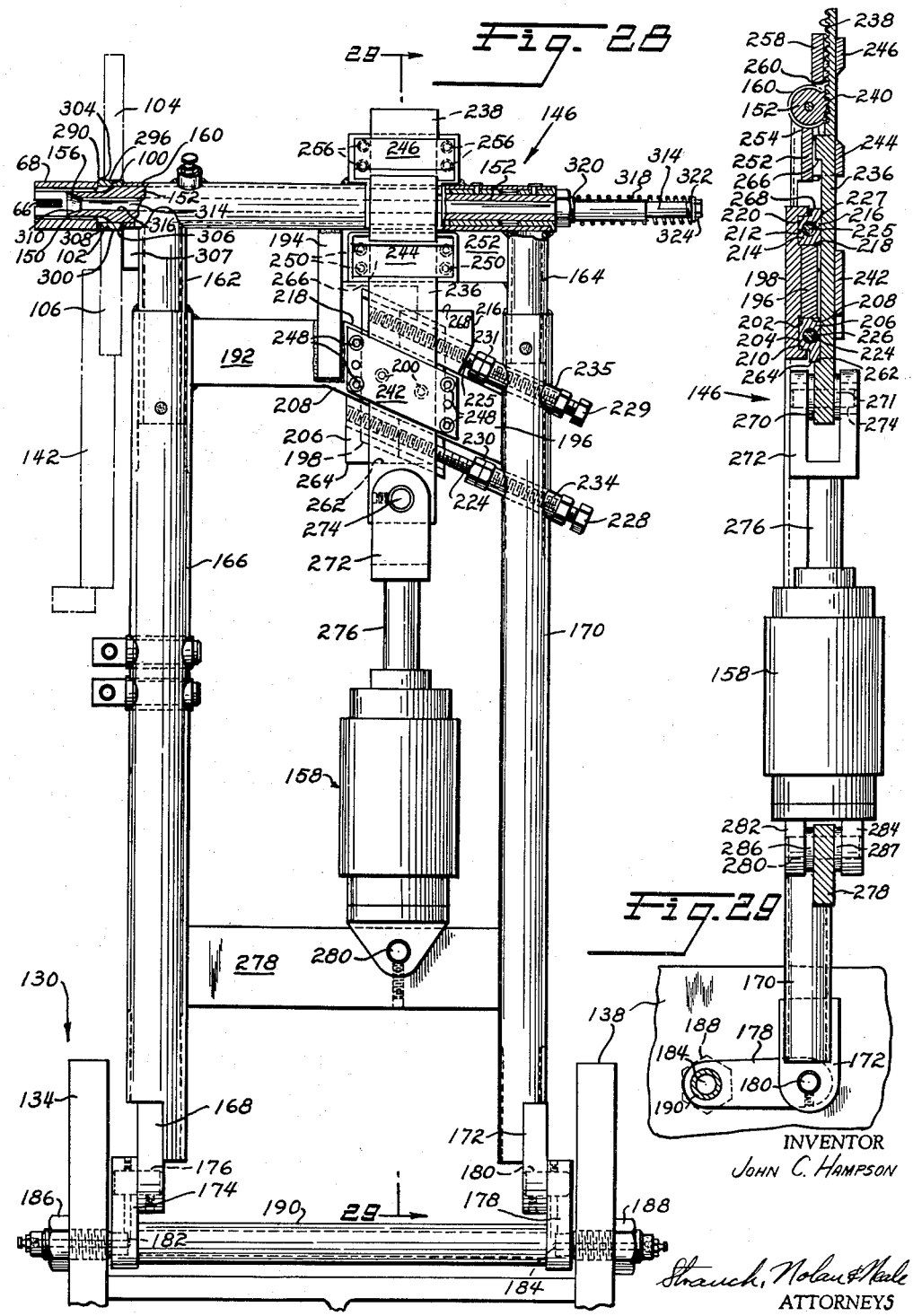

June 29, 1965  J. C. HAMPSON  3,191,636
METHOD OF FORMING A SINUOUS SPRING STRIP
Original Filed June 12, 1956  23 Sheets-Sheet 11
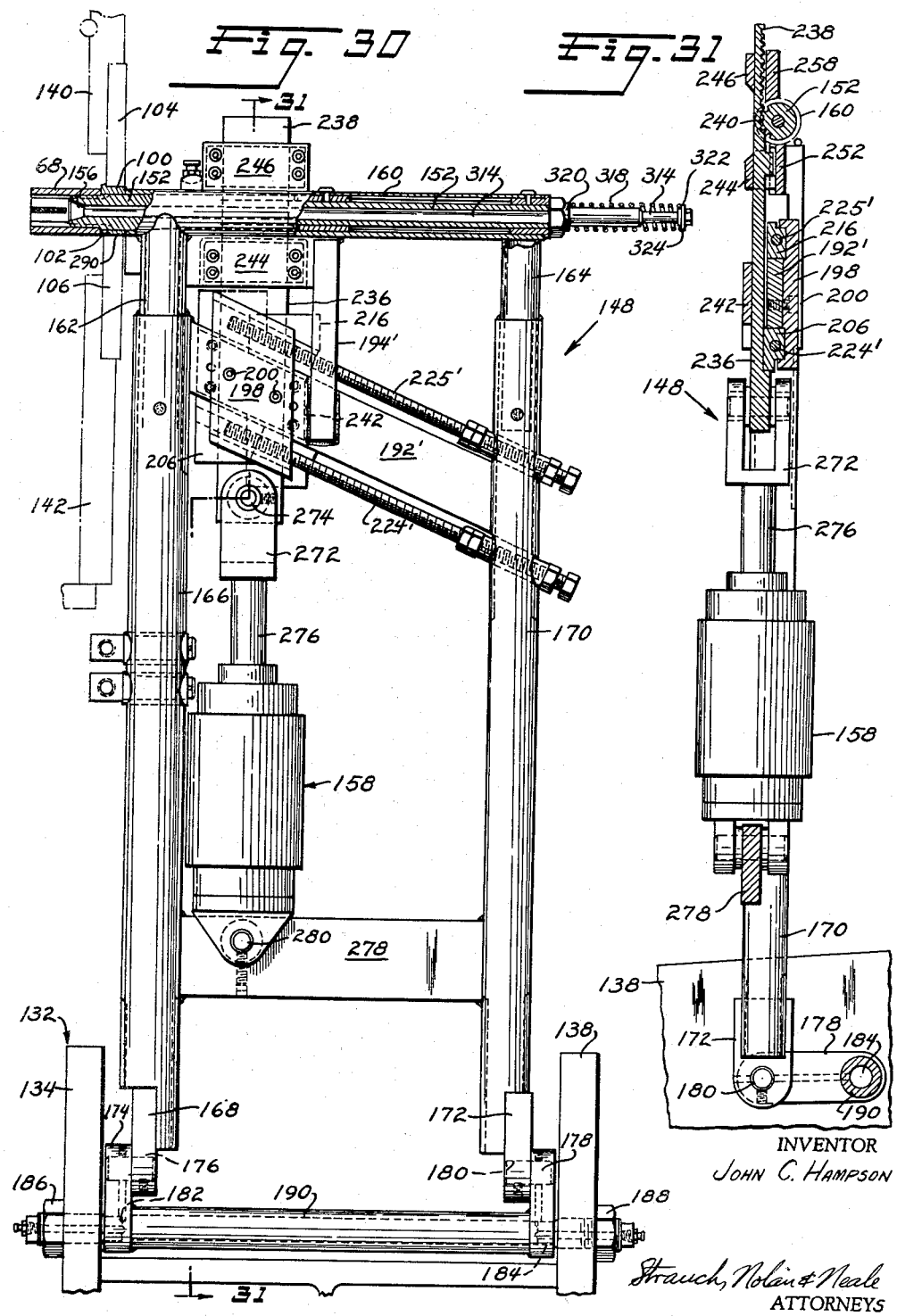
INVENTOR
JOHN C. HAMPSON
Strauch, Nolan & Neale
ATTORNEYS June 29, 1965 J. C. HAMPSON 3,191,636
METHOD OF FORMING A SINUOUS SPRING STRIP
Original Filed June 12, 1956 23 Sheets-Sheet 12

INVENTOR
John C. Hampson
BY
Strauch, Nolan & Neale
ATTORNEYS

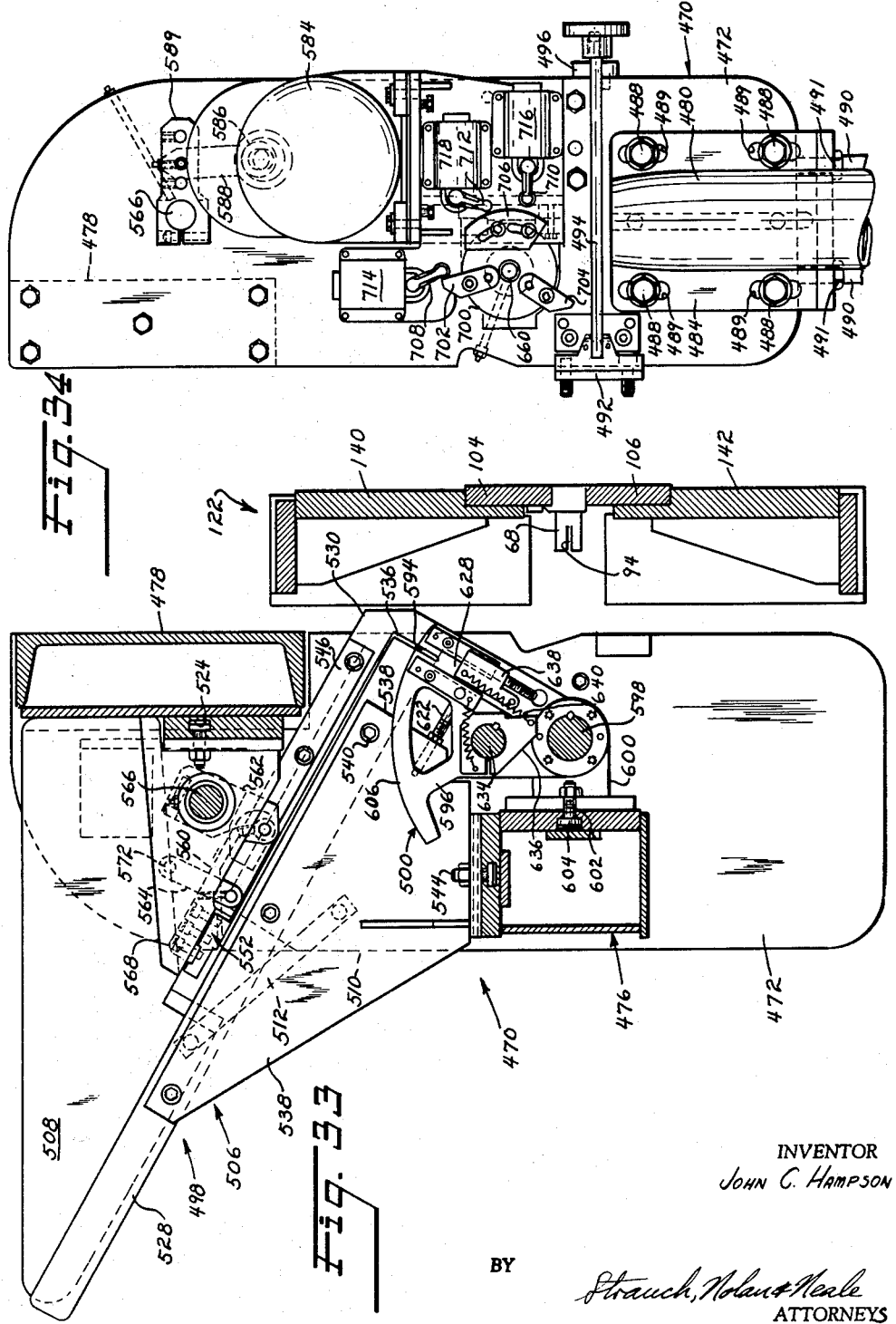

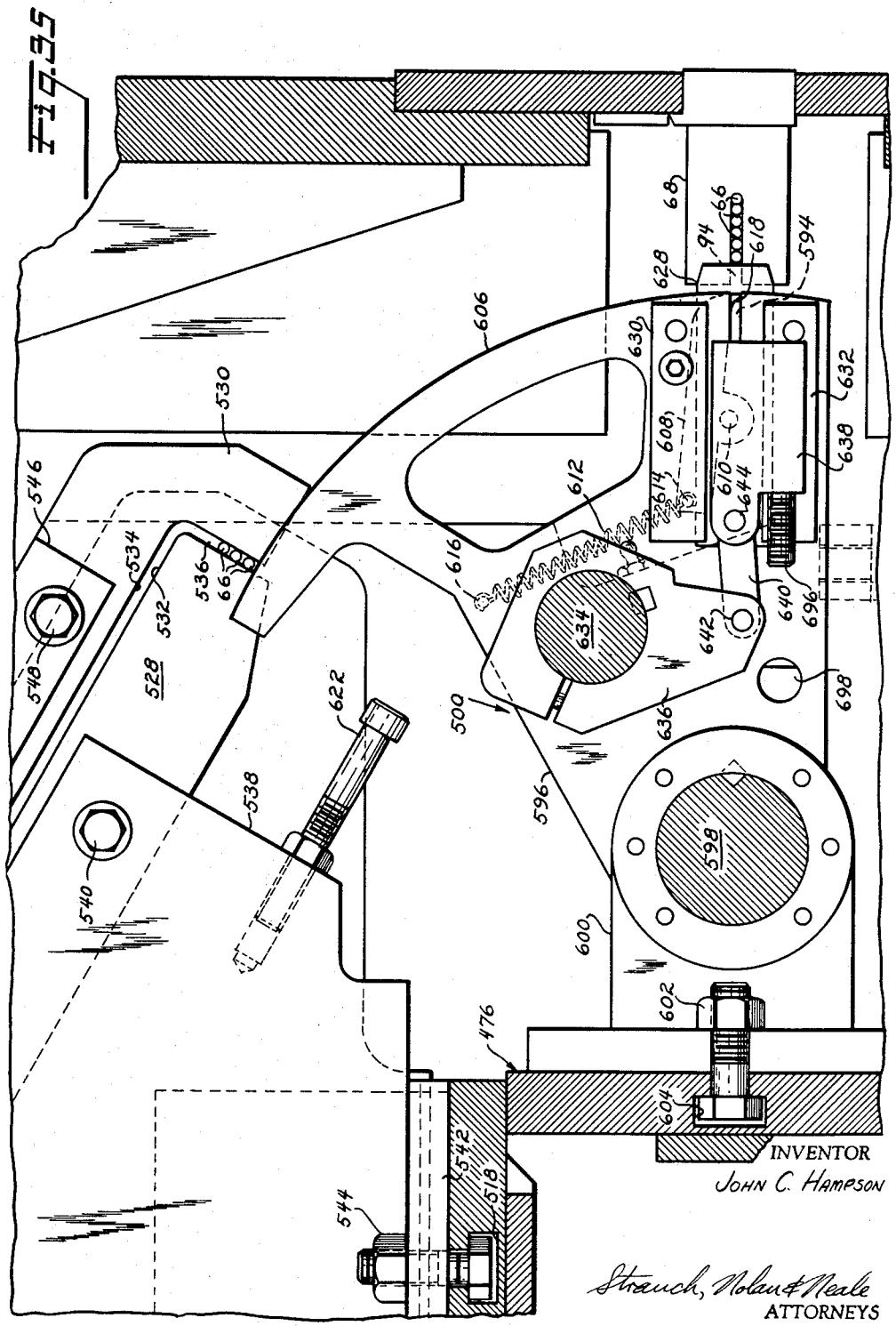

June 29, 1965 J. C. HAMPSON 3,191,636
METHOD OF FORMING A SINUOUS SPRING STRIP
Original Filed June 12, 1956 23 Sheets-Sheet 15

INVENTOR
JOHN C. HAMPSON
BY
Strauch, Nolan & Neale
ATTORNEYS

June 29, 1965   J. C. HAMPSON   3,191,636
METHOD OF FORMING A SINUOUS SPRING STRIP
Original Filed June 12, 1956   23 Sheets—Sheet 16
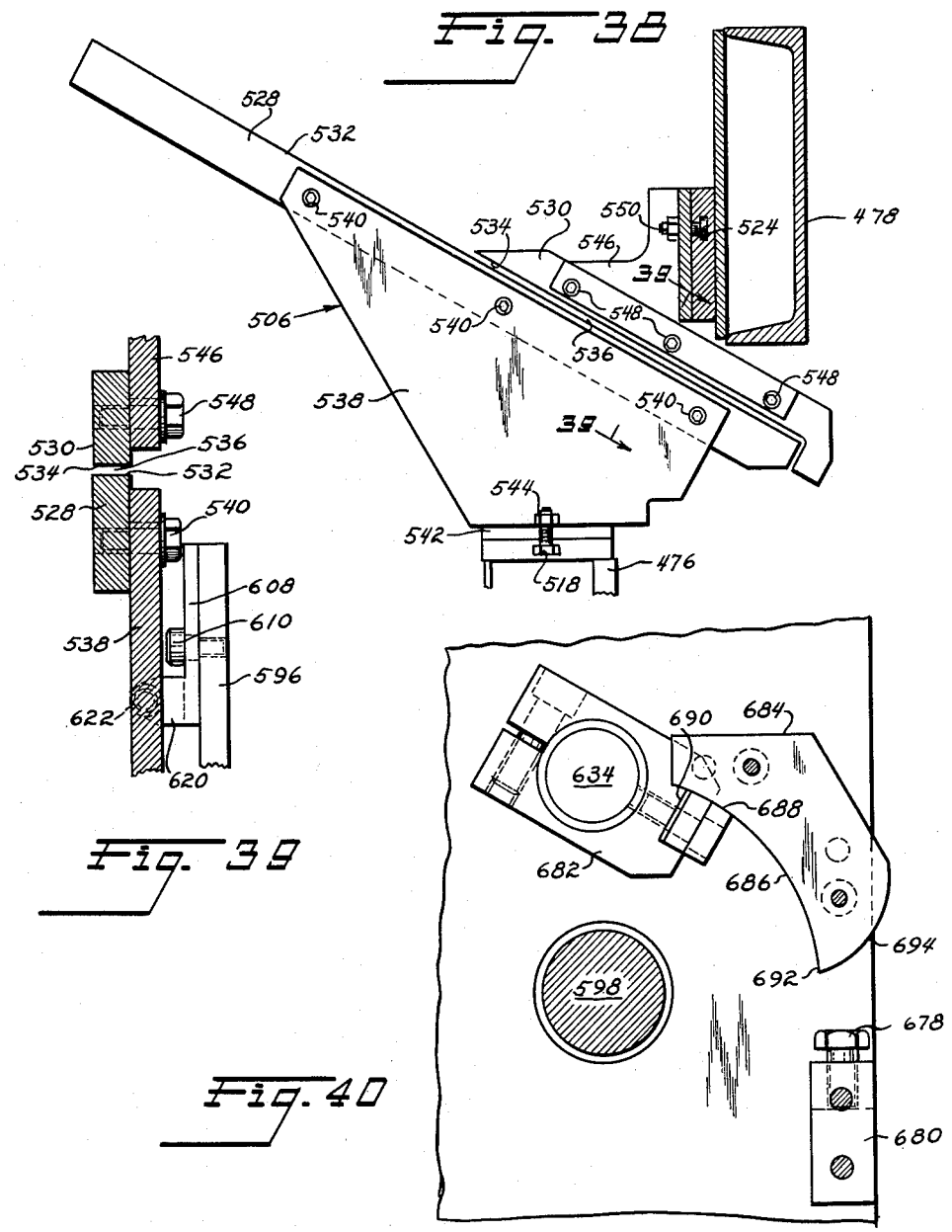
INVENTOR
JOHN C. HAMPSON
BY
Strauch, Nolan & Neale
ATTORNEYS

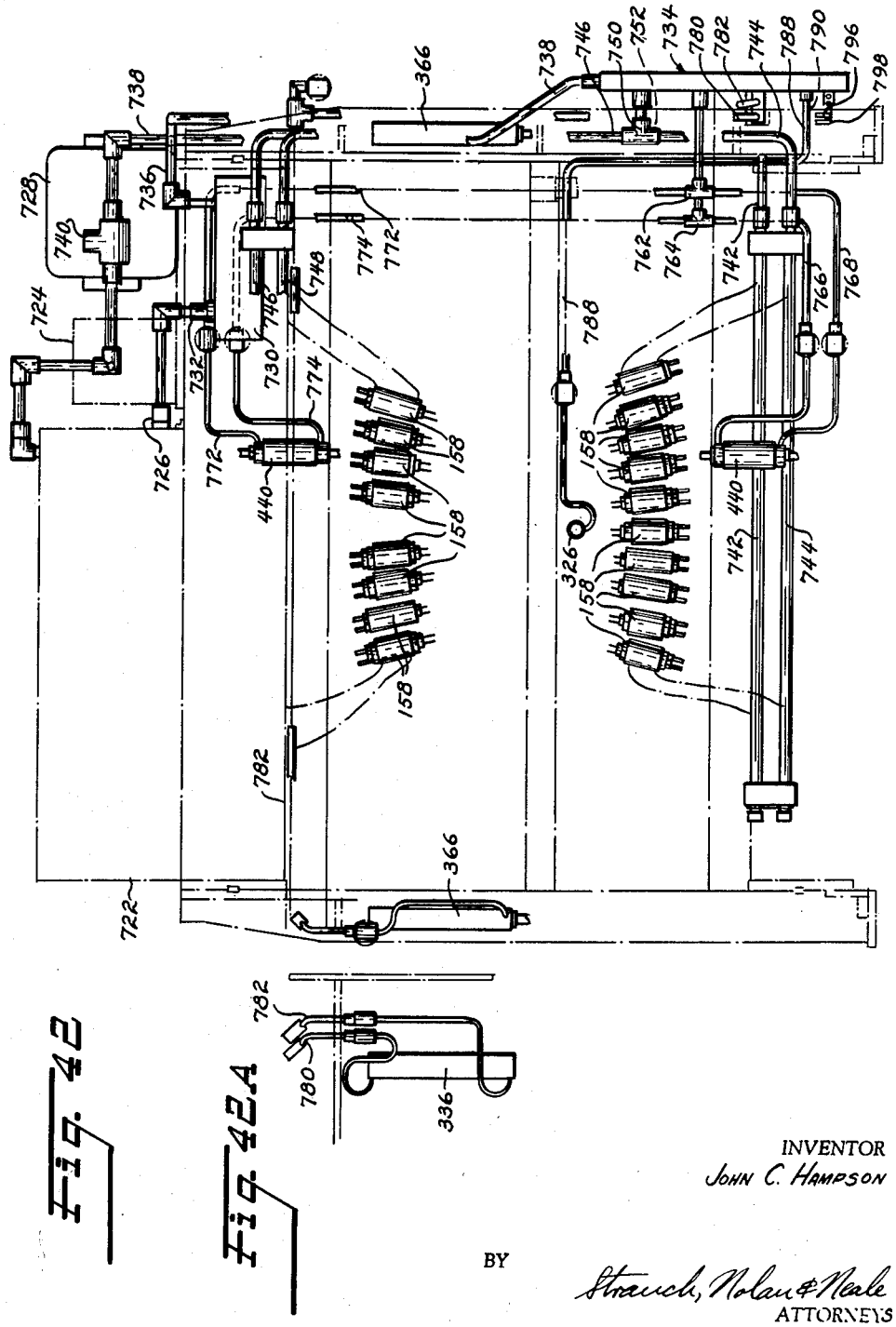

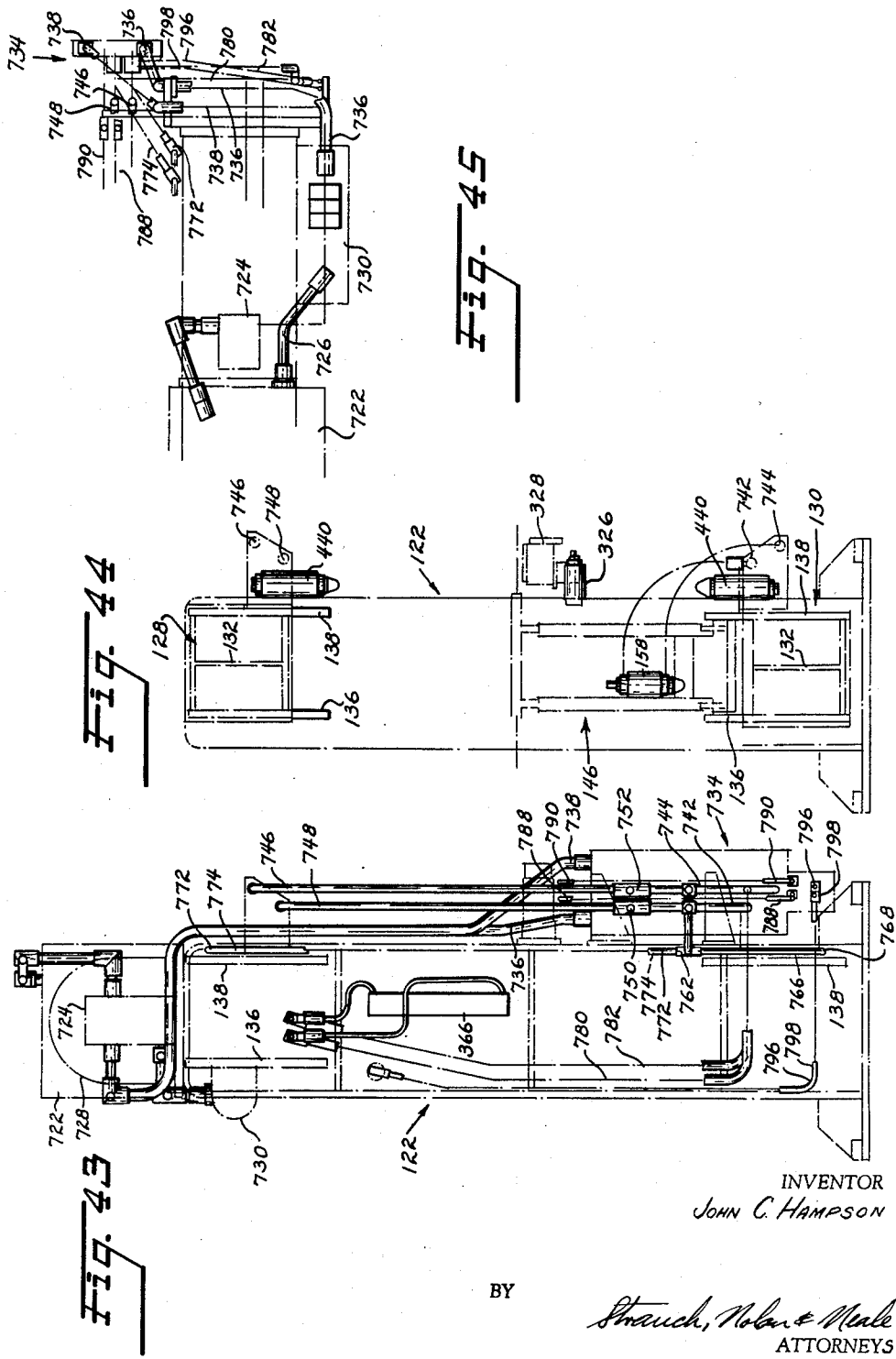

June 29, 1965 J. C. HAMPSON 3,191,636
METHOD OF FORMING A SINUOUS SPRING STRIP
Original Filed June 12, 1956 23 Sheets-Sheet 20

INVENTOR
JOHN C. HAMPSON

Strauch, Nolan & Neale
ATTORNEYS

June 29, 1965  J. C. HAMPSON  3,191,636
METHOD OF FORMING A SINUOUS SPRING STRIP
Original Filed June 12, 1956  23 Sheets-Sheet 22

INVENTOR
JOHN C. HAMPSON

BY
Strauch, Nolan & Neale
ATTORNEYS

INVENTOR
JOHN C. HAMPSON

BY
Strauch, Nolan & Neale
ATTORNEYS

United States Patent Office 3,191,636
Patented June 29, 1965

3,191,636
METHOD OF FORMING A SINUOUS SPRING STRIP
John C. Hampson, Bloomfield Township, Mich., assignor, by mesne assignments, to Rockwell-Standard Corporation, a corporation of Delaware
Original application June 12, 1956, Ser. No. 590,926, now Patent No. 3,057,380, dated Oct. 9, 1962. Divided and this application May 25, 1962, Ser. No. 210,272
7 Claims. (Cl. 140—71)

The present invention relates to sinuous spring strips of the multiple torsion bar multiple spacer bar type and particularly to a method for fabricating such spring strips.

This is a division of my copending application Serial No. 590,926 filed June 12, 1956, issued as Patent No. 3,057,380, dated October 9, 1962.

Spring strips of the general type to which the present invention relates are disclosed in United States Letters Patent No. 2,684,844 issued July 27, 1954 to H. C. Flint et al. for sinuous type of spring with variable length of transverse and longitudinal bars. In the fabrication of such spring strips, as in the fabrication of sinuous spring strips of the type shown in United States Letters Patent No. 2,399,563 issued April 30, 1946 to W. H. Neely for frame construction for seat structures, the wire of which the spring strip is formed is under tension during the bending formation of the spring strip. Examples of machines forming springs in this prior art manner are disclosed in United States Letters Patent Nos. 2,160,020 issued May 30, 1939 to H. F. Horton for Wire Bending Machine, United States Patent No. 2,188,406 issued January 30, 1940 to F. J. Horton for Machine for Forming Springs, and United States Patent No. 2,331,294 issued October 12, 1943 to A. M. Bank et al. for Wire Working Machine. In such prior art springs, the wire becomes stretched during fabrication of the spring strip resulting in a reduction in its diameter, in certain instances, non-uniformity of its diameter, work hardening of the wire, and the introduction of internal stresses within the metal of the wire.

It is a primary object of the present invention to provide an improved method of forming a sinuous spring strip of the multiple torsion bar multiple spacer bar type which after fabrication has a substantially uniform wire diameter substantially equal to the diameter of the wire from which it is fabricated, which is substantially free of internal stresses and which has not been work hardened during the fabrication process.

A further object of the present invention is to provide a novel method for forming a spring strip of the multiple torsion bar multiple spacer bar type from a straight wire substantially equal in length to the length of wire in the finished spring strip by simultaneously folding said wire at a plurality of spaced segments while maintaining such wires substantially free of axial tension to form such a spring strip.

A further object of the present invention is to provide a novel method for forming a sinuous spring strip of the multiple torsion bar multiple spacer bar type from a straight wire of predetermined length substantially equal to the wire length of the finished spring strip by simultaneously gripping such wire at spaced segments corresponding to the torsion bars of the finished spring strip and folding said wire while maintaining said wire substantially free of axial tension to a form in which the gripped portions of such wire are substantially normal to the original axial direction of such wire.

It is a further object of the present invention to provide a novel method for forming a sinuous spring strip of the multiple torsion bar multiple spacer bar type from a straight wire having a predetermined length substantially equal to the wire length of the finished spring strip by gripping such wire at spaced portions corresponding to the torsion bars of the finished spring strip, folding such wire while maintaining said wire substantially free of axial tension to a form in which the gripped portions lie substantially normal to the axial direction of the unformed wire, and simultaneously flattening each of the portions of such wire interconnecting each such gripped portion after folding of such wire.

A further object of the invention is to provide a novel method of forming a tension-free sinuous wire strip for incorporation in an automobile seat or the like wherein a substantially straight wire is gripped at spaced regions along its length by gripping means which are so relatively turned that the wire portions held thereby are disposed parallel with bent longitudinally extending portions interconnecting the alternate ends of said parallel portions, and said bent portions are mechanically formed while said spaced regions are held in parallel relation to so permanently straighten said bent portions that said spaced wire regions will remain parallel upon release from gripping.

Another object is to provide an improved hopper and power feed assembly for an irregularly sinuous spring strip forming machine which feeds precut straight wires to the wire forming heads of the machine.

Another object is to provide in a sinuous spring strip forming machine, an improved wire folding subassembly embodying wire folding head pinion drive rack limit adjustment means which are accessible from the rear of the machine.

A further object is to provide a sinuous strip folding machine embodying wire folding heads subassemblies having finished spring ejecting means utilizing a thrust rod extending through the pivot shaft of each wire folding head.

These and other objects of the present invention will become more fully apparent by reference to the appended claims and as the following detailed description proceeds in reference to the accompanying drawings wherein:

FIGURE 1 is a plan view of a spring strip embodying the principles of the present invention;

FIGURE 2 is a sectional view through the spring strip of FIGURE 1 after it has been bent into its final form for use in a seat or cushion, corresponding to a section substantially along the line 2—2 of FIGURE 1;

FIGURE 3 is a front elevational view partly in section of the spring strip forming machine of the present invention with the wire feed mechanism and certain other parts removed for clarity of illustration;

FIGURE 4 is a sectional view substantially along the line 4—4 of FIGURE 3;

FIGURE 5 is a fragmentary sectional view substantially along the line 5—5 of FIGURE 3;

FIGURE 6 is a right end view of the machine in FIGURE 3;

FIGURE 8 is a fragmentary front elevation view illustrating the spring strip forming heads of the machine of FIGURE 3 in their wire receiving position;

FIGURE 9 is a fragmentary front elevation view of the spring strip forming heads and ram mechanism of the machine of FIGURE 3 in the configuration assumed after twisting of the forming heads and actuation of the rams;

FIGURE 9A is a fragmentary sectional view substantially along the line 9A—9A of FIGURE 9;

FIGURES 10, 11 and 12 are respectively a front, bottom and right side view of one of the types of forming heads illustrated in FIGURE 9;

FIGURES 13, 14 and 15 are respectively a front, right side and bottom view of a second form of forming head illustrated in FIGURE 9;

FIGURES 16, 17 and 18 are respectively a front, bottom and right side view of a third form of forming head of the mechanism of FIGURE 9;

FIGURES 19, 20 and 21 are respectively a front, bottom and right side view of a fourth form of forming head of the mechanism of FIGURE 9;

FIGURE 28 is a right side view partially in section of one of the lower wire folding head mounting arm assemblies of the mechanism of FIGURE 3;

FIGURE 29 is a sectional view substantially along the line 29—29 of FIGURE 28;

FIGURE 30 is a view similar to FIGURE 28 of the upper arm assemblies of FIGURE 3;

FIGURE 31 is a sectional view substantially along the line 31—31 of FIGURE 30;

FIGURE 33 is a sectional view substantially along the line 33—33 of FIGURE 32;

FIGURE 34 is a right end view of the feed mechanism of FIGURE 32;

FIGURE 35 is an enlarged portion of FIGURE 33 showing the wire transfer arm assembly in its wire ejecting position;

FIGURE 38 is a fragmentary sectional view taken substantially along the line 38—38 of FIGURE 32;

FIGURE 39 is a fragmentary sectional view taken substantially along the line 39—39 of FIGURE 38;

FIGURE 40 is a fragmentary sectional view taken substantially along the line 40—40 of FIGURE 32;

FIGURE 42 is a diagrammatic front elevation view of the machine of FIGURE 3 illustrating the hydraulic system of the machine;

FIGURE 42A is a fragmentary left end view of the hydraulic system as shown in FIGURE 42;

FIGURE 43 is a diagrammatic right end view of the machine of FIGURE 3 illustrating the hydraulic system;

FIGURE 44 is a diagrammatic view illustrating portions of the hydraulic system of FIGURE 42 corresponding roughly to a section along the line 5—5 of FIGURE 3;

FIGURE 45 is a diagrammatic fragmentary top view of the hydraulic system illustrated in FIGURE 42;

Figure 7:
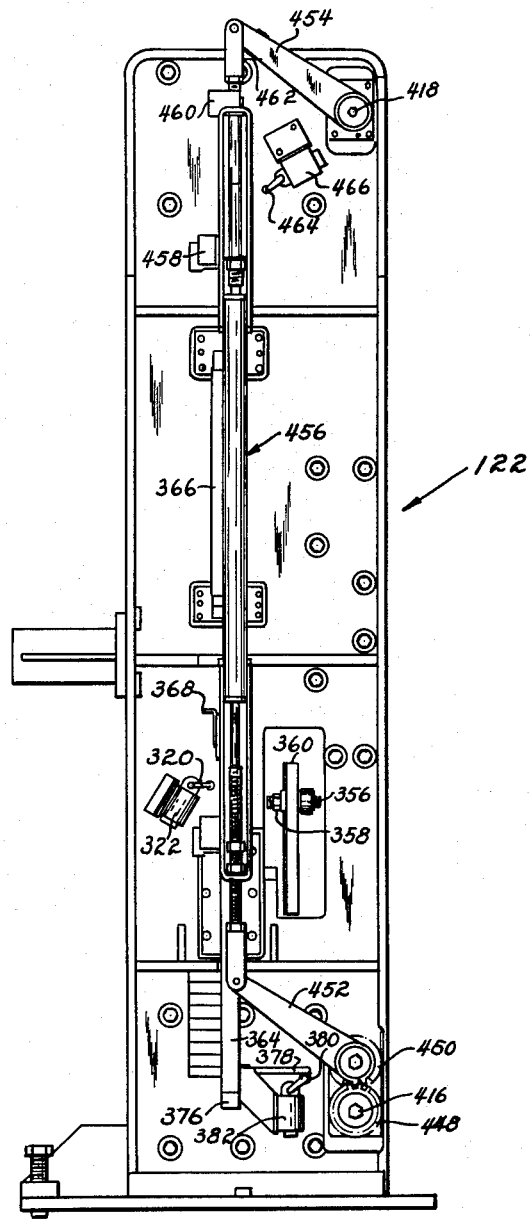
FIGURE 7 is a left end view of the machine in FIGURE 3.

Referring now to the drawings and particularly to FIGURES 1 and 2, there is therein illustrated the new and improved spring strip 60 embodying the principles of the present invention. Spring strip 60 is illustrated in FIGURE 1 in the flat form in which it is originally fabricated and in FIGURE 2 in the form in which it is subsequently bent to form a finished spring strip for a seat or back of a front or rear seat of a passenger car or other vehicle. The spring strip 60 is of the sinuous multiple torsion bar spacer bar type described generally in United States Patent No. 2,684,844 issued July 27, 1954 to H. C. Flint et al. for Sinuous Type of Spring with Variable Lengths of Transverse and Longitudinal Bars.

As illustrated in FIGURES 1 and 2, spring strip 60 is formed from a single wire which has been folded into sinuous form to provide torsion bars 62–$a$ through 62–$u$ extending transversely of the spring strip 60 and interconnected by spacer bars 64–$a$ to 64–$t$. As therein illustrated, the lengths of the torsion bars 62–$a$ through $u$ and the spacer bars 64–$a$ through 64–$t$ are of varying lengths to provide the desired degree of strength of the spring strip 60 at various regions along its length between torsion bars 62–$a$ and 62–$u$. The spring strip 60 of FIGURES 1 and 2 is a novel construction in that the diameter of the wire 66 of which the spring strip 60 is formed is retained in the spring strip 60 throughout its entire length after the spring strip 60 has been fabricated in the form illustrated in FIGURE 1. That is, at any point along the spring strip 60 from the end of torsion bar 62–$a$ to the end of torsion bar 62–$u$, the wire 66 is of uniform diameter within a tolerance of plus or minus .002 inch even in the curved portions interconnecting the spacer bars 64 with the torsion bars 62 and is the same as that of the straight wire from which the spring strip was formed.

The method by which the spring strip 60 is formed in its sinuous form illustrated in FIGURE 1 from a straight wire will now be described in reference to FIGURES 8 and 9. Referring to FIGURE 8, for this purpose a series of wire forming heads 68–$a$ through $r$ are provided. The adjacent pairs of the forming heads 68–$a$ through $r$ are interconnected by links 70–$a$ through $q$, the links 70 being pivotally interconnected at their opposite ends to the adjacent ends of the forming heads 68 between which they are interposed.

Figure 22:
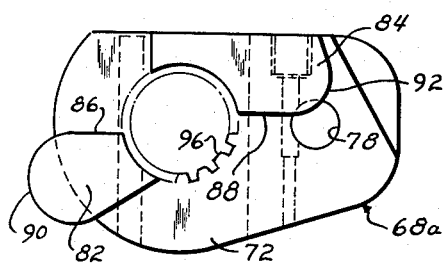
FIGURES 22, 23 and 24 are respectively a front, right side and bottom view of a fifth form of forming head of the mechanism of FIGURE 9.
Figure 23:
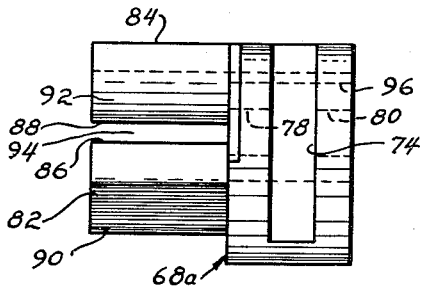
Figure 24:
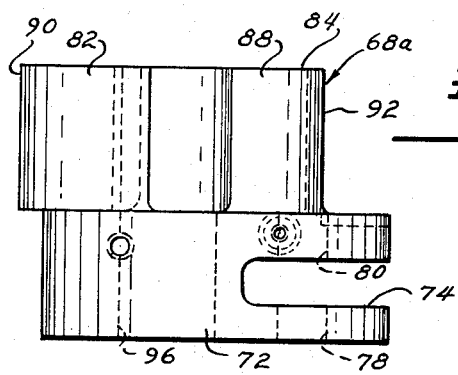
Figure 25:
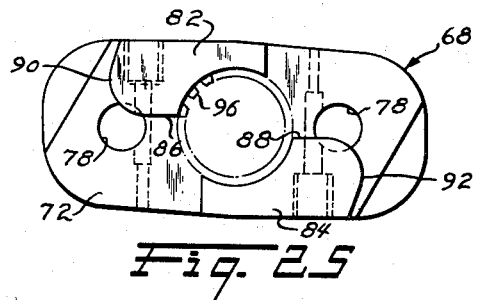
FIGURES 25, 26 and 27 are respectively a front, right side and bottom view of sixth form of forming head of the mechanism of FIGURE 9.
Figure 26:
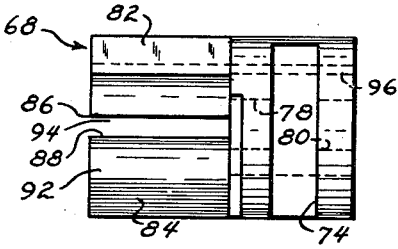
Figure 27:
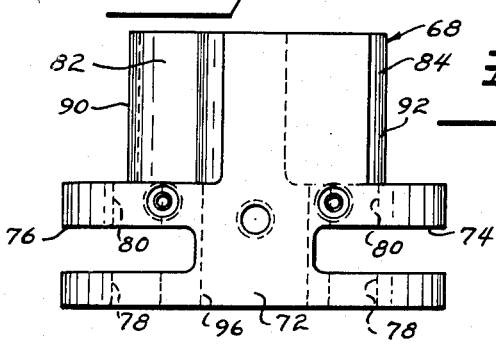

The detailed configuration of forming head 68–$a$ is illustrated in FIGURES 22 to 24; of head 68–$b$ in FIGURES 10 to 12; of head 68–$c$ in FIGURES 13 to 15; of head 68–$d$, in FIGURES 25 to 27; of head 68–$e$, in FIGURES 16 to 18; of head 68–$f$, in FIGURES 10 to 12; of head 68–$g$ in FIGURES 16 to 18; of head 68–$h$ in FIGURES 10 to 12; of heads 68–$i$, $j$, $k$, and $l$, in FIGURES 13 to 15; of heads 68–$m$, $n$, $o$, and $p$, in FIGURES 19 to 21; and of head 68–$q$, in FIGURES 16 to 18.

Referring to FIGURES 10 to 12, the head 68 is an integral member having a relatively wide base 72 bifurcated at its opposite end at 74 and 76 to receive the ends of the links 70 which it interconnects and provided with aligned apertures 78 and 80 for the mounting of a pivot pin therein to form a pivotal connection between the heads 68 and the links 70 to which they are connected. Projecting forwardly from the base portions 72 is a pair of anvils 82 and 84 having parallel flat surfaces 86 and 88 and curved end surfaces 90 and 92 respectively. As is apparent from FIGURE 12, the flat surfaces 86 and 88 define an open ended throat 94 into which a group of parallel wires may be inserted prior to forming and from which such wires may be ejected after forming into spring strips.

As is apparent from an inspection of FIGURES 13 through 27, each of the other heads, with the exception of head 68–$a$ shown in FIGURES 22 to 24 is of similar general arrangement having spaced anvils 82 and 84 providing planar apparallel surfaces 86 and 88 merging into curved end surfaces 90 and 92 and defining throats 94. Head 68–$a$ shown in FIGURES 22 to 24 differs from the other heads 68 in that, being an end head, there is provision for pivotal interconnection to a link 70 at only one end.

When the forming heads 68–a through r are in their position illustrated in FIGURE 8, the surfaces 86 of all of the heads 68 are coplanar and the surfaces 88 of all of the heads 68 are coplanar so that all of the throats 94 are in alignment to define a continuous slot into which the straight wires 66 may be inserted. The depth of the throats 94 are much greater than the diameter of a single wire 66. In practice, a plurality of wires 66 are simultaneously inserted in the slot defined by the throats 94 for simultaneous forming.

The straight wire 66 which is unconstrained lengthwise, is initially folded into the sinuous form of the spring strip 60 by simultaneously rotating all of the heads 68 approximately 90° about the axis of the bores 96 thereof, adjacent heads being rotated in opposite directions. Simultaneously with the rotation of heads 68, the heads 68 move together toward the center of the machine to the position illustrated in FIGURE 9 under the influence of the links 70 interconnecting adjacent heads 68. The detail structure by which this is accomplished will be described in detail hereinafter. It will suffice for the present to point out that heads 68–a, c, e, g, i, k, m, o and q are rotated approximately 90° in a clockwise direction as viewed in FIGURES 8 and 9 about the axes of their bores 96 and that heads 68–b, d, f, h, j, l, n, p and r are rotated approximately 90° in a counterclockwise direction about the axes of their bores 96 during this movement. Due to the interconnection between adjacent pairs of heads 68 by the links 70, the heads 68 are drawn together to the position shown in FIGURE 9 as these rotational movements are imparted to the heads 68. The final spacing between the axes and the bores 96 of each adjacent pair of the heads 68 is determined by the length of the link 70 interconnecting each such pair.

As is apparent from FIGURE 9, the length of the spacer bars 64–b through 64–s are determined by the spacing between the pivot axes at the opposite ends of the links 70–a through q and the length of the torsion bars 62–b through t are determined by the spacing between parallel tangents to the surfaces 90 and 92 normal to the surfaces 86 and 88 for the heads 68–a through 68–q. There is therefore no material stretching of the wire 66 during movement of the heads 68 between their positions of FIGURES 8 and 9. This prevents reduction in the wire diameter, hardening and internal stressing of the wires 66.

As will be explained in greater detail later, the shafts upon which the heads 68 are fixed are guided for translatory movement between their widely spaced positions shown in FIGURE 8 and their adjacently spaced positions shown in FIGURE 9 between upper and lower guide surfaces 100 and 102 on parallel guides 104 and 106 respectively.

In order that the spring strip 60 will retain the shape into which it has been folded by the movement of the heads 68 from their position shown in FIGURE 8 to the position shown in FIGURE 9, it is necessary to fully conform the wire 66 to the anvils 82 and 84 on each of the heads 68. For this purpose, a plurality of hammers 108–a to 108–q are provided in poistion to engage the spacer bars 64–b to 64–t substantially midway of their lengths. The lower hammers 108–a, c, e, g, i, k, m, o and q are mounted in a longitudinally extending slot 110 in a lower ram plate 112 which is mounted upon the machine frame for vertical translatory reciprocation in a manner which will be described later and the hammers 108–b, d, f, h, j, l, n and p are mounted in a longitudinally extending slot 114 of an upper ram plate 116 which is similarly mounted for vertical reciprocation. Once the heads 68 have moved to the position shown in FIGURE 9, the upper and lower ram plates 116 and 112 are lowered and raised, respectively, simultaneously so that the hammers 108–a through q will engage and straighten the spacer bars 64–b through t and form the wire 66 about the curved surfaces 90 and 92 of the anvils 82 and 84 respectively on each of the heads 68. After reaching the limit of their strokes toward the wire 66, the rams 112 and 116 are restored toward their initial inoperative position. This forming of the wire 66 by the hammers 108 relieves the pressure of the wire 66 upon the anvils 82 and 84 of the head 68 resulting from the initial folding of the head 68 so that the wire 66 rests relatively freely in the throats 94 of the heads 68 and about the anvils 82 and 84 thereof. As the rams 116 and 112 return toward their inoperative position, the wire or wires 66 thus formed into the spring strips 60 are ejected from the heads 68 through the open ends of the throats 94 thereof. The heads 68 are then restored to the position shown in FIGURE 8 so that the cycle of operation may be begun again.

The torsion bar 62–a is formed about the anvil 82 of head 68–a by a pivoted lever 118 that is pivotally mounted by a stud 120 upon the upper ram plate 116.

The description will now proceed with a detailed explanation of the structure and mode of operation of the wire forming machine of the present invention which controls the movements of the components illustrated in FIGURES 8 and 9 in the manner just described.

The general arrangement of the spring forming machine 122 of the present invention is best illustrated in FIGURES 3, 4, 5, 6 and 7. Referring first to FIGURES 3 and 4, the frame of the machine comprises a pair of spaced parallel side frame members 124 and 126 which are rigidly interconnected at the top and bottom by a top beam structure 128 and a bottom beam structure 130. As is best shown in FIGURE 4, beam structures 128 and 130 comprising an I-beam 132, a front plate 134, an internal reinforcing plate 136 and a rear plate 138. These members are rigidly interconnected to form the beam structures 128 and 130. At the front of the machine, a pair of plates 140 and 142 in general vertical alignment with the plates 134 extend across the machine between the side plates 124 and 126 substantially midway of the height of the machine. These plates 140 and 142 are the supports upon which the ram plates 112 and 116 are reciprocably mounted and upon which the guide plates 104 and 106 for the forming head 68 are mounted.

As is apparent from FIGURES 8 and 9, adjacent ones of the wirefolding heads 68 are rotated in opposite directions in their movements from their positions of FIGURE 8 to those of FIGURE 9, heads 68–a, c, e, g, i, k, m, o, and q rotating clockwise and heads 68–b, d, f, h, j, l, n, p and r rotating counterclockwise. The clockwise rotating heads 68 are mounted on upwardly extending pivoted mounting arm assemblies 146 (indicated by their center lines in FIGURE 3) which are shown in detail in FIGURES 28 and 29 and the counterclockwise rotating heads 68 are mounted in downwardly extending pivoted mounting arm assemblies 148 (also indicated by their center lines in FIGURE 3) which are shown in detail in FIGURES 30 and 31. Assemblies 146 and 148 are pivotally mounted on the plates 134 and 138 of the lower and upper beam structures 128 and 130 as illustrated in FIGURES 3 and 4 as will be described in detail presently.

Referring to FIGURES 28 and 29, each head 68 is internally splined at 150 to a tubular drive shaft 152. The inner portions of anvils 82 and 84 of each head 68 (FIGURES 10 to 27) are bored at 154 at approximately the root diameter of splines 150 to provide clearance for a frusto conical spring ejecting head 156 (FIGURE 28). Ejecting head 156 is actuated to eject the spring strips 60 from the wire twisting and forming heads 68 after the spring strips 60 are finished formed with multiple torsion bars 62 of various lengths and multiple spacer bars 64 of various lengths and various slopes such as appears in FIGURES 1 and 9.

The size of the heads 68 used dictates the size and power requirements of the hydraulic cylinders 158 which impart power to shaft 152. Longer or shorter spring strips 60 with more and less convolutions may be made by using additional or less heads 68 by pairs as desired. Spring wire 66 is held within the standard tolerance of plus or minus 0.002 inch for diameter and ovality through all radii folds throughout the length of spring strip 60 for all of the various wire sizes used for this type of spring.

In each arm assembly 146, the head drive shaft 152 is rotatably journalled within a tube 160 to which are fixed right angle tubular extensions 162 and 164 at the front and rear, respectively, of tube 160. The lower end of tubular extension 162 is received in and fixed to forward tubular arm 166 to the opposite end of which is fixed an axially extending flange 168. The lower end of tubular extension 164 is received in and fixed to rear tubular arm 170 to which is fixed a flange 172 at the opposite end. Arm assemblies 146 are mounted in the machine 122 between the plates 134 and 138 of beam structure 130 by double fulcrum pivot assemblies comprising a forward arm 174 pivotally receiving a pin 176 held by flange 168 and with rear arm 178 pivotally receiving a pin 180 held by flange 172. Pivot center members 182 and 184 are threaded through the plates 134 and 138 respectively, and are locked in place by nuts 186 and 188 and extend into opposite ends of a tubular cross member 190. The arms 174 and 178 are pivoted on the portions of members 182 and 184 intermediate the ends of cross member 190 and the adjacent faces of plates 134 and 138.

A cross member 192 extends from tubular arm 166 and is welded to bracket arm 194 which depends from tube 160. Angled portion 196 of cross member 192 extends beyond bracket arm 194 to rear tubular arm 170 at an angle to both bracket arm 194 and tubular arm 170. A guide plate 198 (FIGURE 29) is fastened to the back of portion 196 of cross member 192 by screws 200 (FIGURE 28). Guide plate 198 is provided with channel 202 which receives projection 204 of lower adjustment wedge block 206 which is adjustably slidable along angled bottom edge 208 of cross member portion 196 and edge 210 of channel 202. Guide plate 198 is provided with channel 212 which receives projection 214 of upper adjustment wedge block 216 which is adjustably slidable along angled upper edge 218 of cross member portion 196 and edge 220 of channel 212. Adjusting screws 224 and 225 for the adjustment wedge blocks 206 and 216 are threaded into threaded openings 226 and 227 in wedge blocks 206 and 216. Screws 224 and 225 are provided with bolt heads 228 and 229 and extend through upper or lower jam nuts 230 and 231 and tube assemblies 234 and 235 which extend through and are welded to rear tubular arm 170.

Rack member 236 with rack 238 at one end which engages pinion gear 240 formed integrally upon the periphery of drive shaft 152 is held in alignment for twisting and return strokes of head 68 by channel guide brackets 242, 244, and 246. Channel guide bracket 242 is fastened to portion 196 of cross member 192 by screws 248. Channel guide bracket 244 is fastened by screws 250 to member 252 which extends between and is welded to bracket arm 194 and tubular extension 164 and welded at 254 to tube 160. Channel guide bracket 246 is fastened by screws 256 to member 258 which is welded at 260 to tube 160. Rack member 236 is shown in FIGURES 28 and 29 in its position in which head 68 is positioned to receive a straight wire prior to the wire folding operation, rack shoulder 262 being in abutment with edge 264 of adjustment wedge block 206. During a folding operation, shoulder 266 of rack member 236 comes into abutment with edge 268 of adjustment wedge block 216, the lower limit of travel of rack 236, to thereby establish the desired limit of the wire 12 folding stroke.

The lower end of rack member 236, which extends between washers 270 and 271 and into yoke 272, is pivotally fastened to the yoke by pivot pin 274. Yoke 272 is fixed to the end of the reciprocable output shaft 276 of hydraulic cylinder 158 which is pivotally anchored to arm assembly cross bracket 278 by pivot pin 280. Pivot pin 280 extends through hydraulic cylinder fork arms 282 and 284, washers 286 and 287 and cross bracket 278 which is welded at its opposite ends to and extends from arm 166 to arm 170.

A rail guide block 290 pivotally supports the shaft 152 and arm assembly 146 in alignment with respect to frame guide rails 104 and 106 which extend transversely across machine 122. Blocks 290 are rectangular with a flat top 296 which rides along the bottom surface 100 of top guide rail 104 and a flat bottom 300 which rides along top surface 102 of bottom guide rail 106. Shoulder 304 of block 290 prevents displacement of the arm assembly 146 axially of shaft 152 when wire 66 is inserted into throat 94 prior to initiation of the wire bending cycle. Blocks 290 are axially restrained in position with respect to the respective shaft 152 and arm assembly 146 between end 306 of tube 160 and end 308 of forming head 68. Blocks 290 guide the transversal motion of the heads 68 and arm assemblies 146 inward toward the center of the machine 122 as the overall length of wires 66 is shortened by folding and forming to the shape of spring strip 60. Abutment pad 307 comes into abutment with rail 106 during ejectment of spring strips 60 to prevent deformation of arm assemblies 246.

The ejecting head 156, which is received in frusto conical end opening 310 in shaft 152 is threaded on the end of ejector rod 314. Ejector rod 314 extends through axial tubular opening 316 in the shaft 152 to the rear of machine 122. A return spring 318 resiliently compressed between shoulder 320 of each shaft 152 and washer 322 mounted on the end of ejector rod 314 by a nut 324 resiliently biases rod 314 and its ejecting head 156 to the return position illustrated in FIGURE 28.

The ejecting rods 314 of all assemblies 146 and 148 are actuated simultaneously by a mechanism best shown in FIGURE 4. Wire spring ejecting hydraulic cylinder 326, which is mounted on bracket assembly 328 at the rear of machine 122 is operatively connected to rocker arm 330. Rocker arm 330, which is pivotally mounted by pin 332 and pin support 334 to bracket assembly 328, is pivotally connected by pin 336 to ram rod 338 which, in turn, is pivotally connected by pin 340 to ram cross bar assembly 342. Ram cross bar 342 extends transversely across machine 122 in proper alignment to contact the nuts 324 on the rear end of ejector rod 314 of each assembly 146 and 148, overcome the resilient force of springs 318 and ejects finish formed spring strips 60 from the machine when hydraulic cylinder 226 is actuated.

Arm assemblies 148 (FIGURES 30 and 31) are substantially the same in construction as arm assemblies 146 which have just been described in detail. In arm assemblies 148, however, rack member 226 engages the other side of pinion gear 240 in order that a downward (as viewed in FIGURES 30 and 31) stroke of rack member 236 will rotate the respective shaft 152 and wire folding head 68 in a counterclockwise direction. In addition, the cross member 192' used in place of member 192 of arm assembly 146 is angled entirely across from front arm 166 through its welded connection with an extended bracket arm 194' to rear arm 170. Rack member 136, the associated members, and hydraulic cylinder 158 are, in the arm assembly 148, aligned to pass between front arm 166 and bracket arm 194' rather than between arm 194 and rear arm 170 as shown in the arm assembly 146 and each adjusting screw 224' and 225' is longer for the arm assemblies 148.

The center arm assembly 148 (FIGURE 3), instead of being pivotally mounted and transversely displaceable across machine 122 as illustrated in FIGURES 28 and 29 is fixed in position at the center of the machine 122. All other arm assemblies 146 and 148 are pivotally mounted by double fulcrum pivot arms 174 and 178. The arm assemblies 146 and 148 at each end of the machine at both the top and bottom are pivotally mounted by adjustable length double pivot assemblies 346 in order that the associated heads 68 will shift along rails 104 and 106 converging toward the fixed center arm assembly 146 during folding and forming of wires 66 to spring strips 60. Double fulcrum pivot assemblies 346 may be repositioned on the respective plates 134 as necessary when more or less arm assemblies 146 and 148 are used.

In order to affect spreading of the heads 68 to their initial position shown in FIGURE 8 after ejection of the formed spring strips 60, the end arm assemblies 146, pivotally mounted to bottom plate 134 at each end, are each provided with a bridge flange 348 which is welded to the outer side of the front arm 166 of assemblies 146 and a pin 350 at the center of each bridge flange 348 for connection with a slot 352 in connecting member 354. Each connecting member 354 is part of an adjustable length pull rod assembly 356 which is pivotally connected at 358 to crank arms 360 driven by pinion gears 362 at the opposite ends of machine 122.

Each pinion gear 362 is operatively engaged by a rack member 364 driven through the downward spread stroke by a hydraulic cylinder 366. Referring to FIGURES 6 and 7, each rack member 364 has a flange 368 which contacts the control lever 370 of a hydraulic line valve 372 at the end of the downward spread stroke. An adjustable bolt assembly 374 (FIGURE 3) threaded through arm 376 on the bottom of each rack member 364 contacts a pivotally mounted arm member 378 (FIGURES 6 and 7) which moves the control lever 380 of a hydraulic line valve 382.

Referring to FIGURES 5, 9 and 9A, ram tools or hammers 108 are mounted on upper and lower ram plates 116 and 112 by nut and bolt assemblies 384. The bolt shanks extend through a vertically elongated slot 386 in ram tool 108 and through slots 110 and 114 in ram plates 112 and 116, the heads 388 of each bolt assembly 384 being received in the undercut portion 390 of slots 110 and 114 of plates 112 and 116. A ram tool height adjusting bolt 392 is threaded into the head 394 of each ram tool 108 and abuts edge 396 of the respective ram plates 112 and 116. The heads 394 of ram tools 108 are formed with suitably shaped working surfaces to accommodate the various lengths and slopes of spacer bars 64 of the spring strips 60. As has been pointed out, after wire folding heads 68 have finished folding and the head mounting assemblies 146 and 148 are in the position shown in FIGURES 3 and 9, ram tools 108 are forced against spring spacer bars 64 to straighten them and thereby finish form the spring strips 60 about the anvil projections 82 and 84 of heads 68. This also loosens spring strips 60 for free stripping from the anvil projections 82 and 84 and facilitates ejectment of the finish formed spring strips 60 from the folding heads 68.

Forming tool assembly 400 is provided for folding spring torsion bar 62a about the anvil projection of a head 68a when upper ram plate 116 is ram actuated. Referring to FIGURE 3, end guide members 404, 405, 406 and 407 are fixed by bolts 408 to the upper and lower machine frame transverse members 140 and 142 which mount frame guide rails 104 and 106. End guide members 404 to 407 extend over the ends of ram plates 112 and 116 and guide up and down motion thereof over the front face of the respective frame members 140 and 142.

Referring to FIGURES 3 and 5 ram plate 112 is supported by those thrust bars 410a, b and c which are coaxially pivotally connected at their upper ends to ram plate 112 by pivot assemblies 412a, b and c, and at their lower ends to cranks 414a, b and c fixed on a common shaft 416. Ram plate 116 is similarly supported by three thrust bars 410d, e and f which are pivotally connected at their lower ends to ram plate 116 by pivot assemblies 412d, e and f, and at their upper ends to cranks 414d, e and f fixed on a common shaft 418 parallel to shaft 416. Shafts 416 and 418 are actuated for oscillatory movement by fluid motors on the rear plates 138 of beam structures 128 and 130, through lever crank mechanisms 420 and 422, the motor and mechanism for shaft 416 being illustrated in FIGURE 5 in detail. The mechanism 420 comprises a crank 424 fixed to shaft 416, a lever 426 pivoted to crank 424 and extending through openings 428, 429 and 430 in the plates 134, 136, and beam 132, a crank 432 pivoted to beam 132 and lever 426, a lever 434 pivoted on crank 432, and a crank 436 pivoted on plate 138 and to lever 434. Crank 436 extends through an opening 438 in plate 138 and is pivotally connected to a hydraulic cylinder 440 mounted on the rear of the machine. Flange 442 on crank 436 contacts control lever 444 of hydraulic line valve 446.

Referring to FIGURES 3 and 7, extensions of shafts 416 and 418 project beyond plate 124 at the left end of the machine. A gear 448 mounted on lower shaft 416 meshes with a gear 450 which is fixed to a lever 452. A lever arm 454 is mounted on upper shaft 418. Both arms 452 and 454 rotate in a clockwise direction as viewed in FIGURE 5 when both shafts 416 and 418 are actuated to move ram plates 112 and 116 to their actuated position and in a counter-clockwise direction when shafts 416 and 418 are rotated to deactivate rams 112 and 116. Arms 452 and 454 are connected together by resiliently compressible link assembly 456. Microswitch 458 is actuated and deactuated by block 460 on link assembly 456. Flange 462 on upper arm 454 contacts control lever 464 of hydraulic line valve 466 in the deactivated position of shaft 418.

The mechanism for feeding straight wires 66 into throats 94 of the heads 68 when in their wire receiving position as illustrated in FIGURE 8 is shown in FIGURES 32 to 41.

Figure 32:
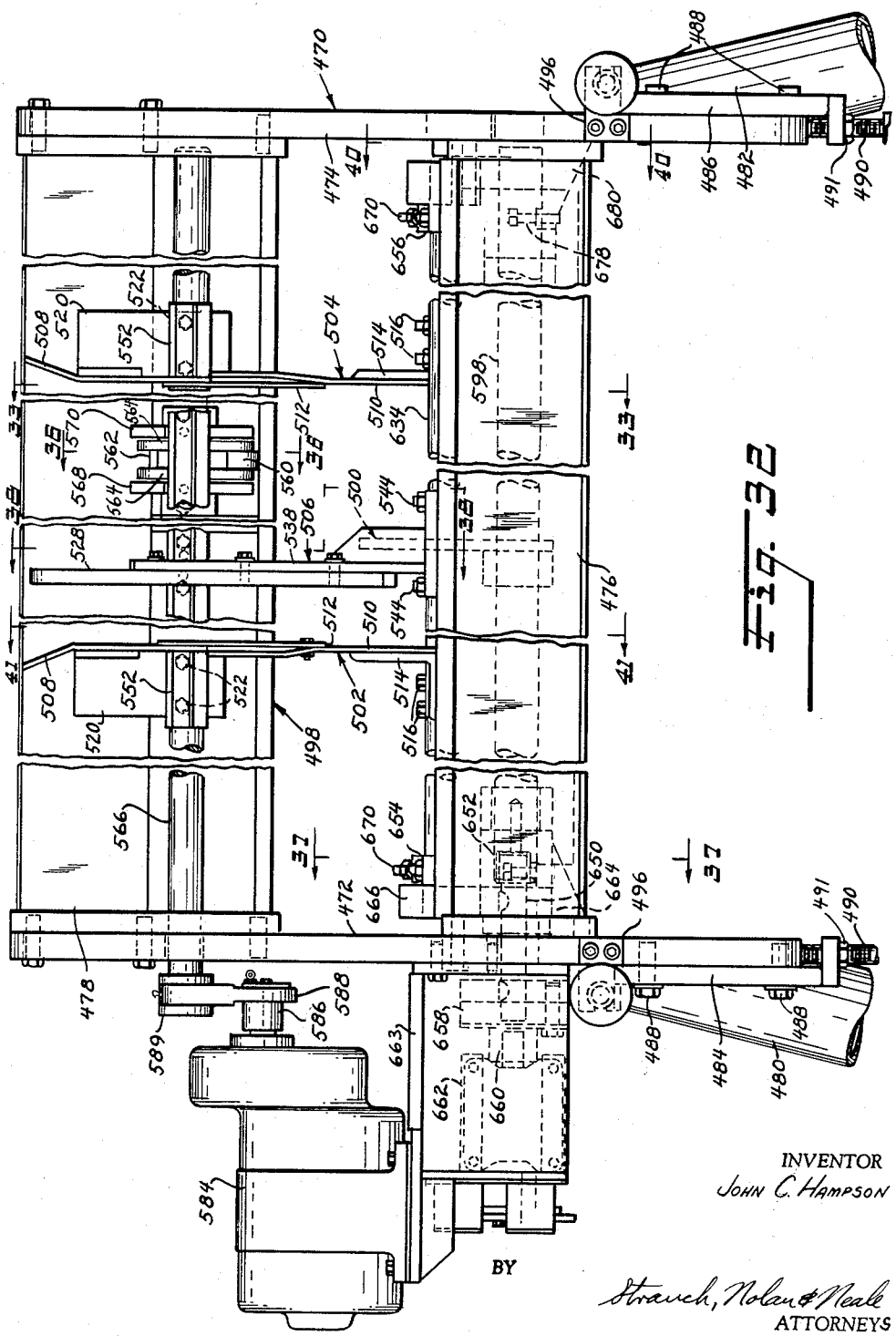
FIGURE 32 is a front elevational view partially broken away of the wire feed mechanism which is mounted on the front of the machine shown in FIGURE 3.

Referring first to FIGURES 32 to 34, the feed mechanism is provided with a frame formed by spaced parallel side plates 472 and 474 interconnected by horizontally extending beam structures 476 and 478. The side plates 472 and 474 are supported by hollow tubular legs 480 and 482 and mounted thereon for limited vertical adjustment by brackets 484 and 486 which are fixed to the legs 480 and 482 respectively, and which are connected to plates 472 and 474 by bolts 488 which extend through elongated slots 489 (FIGURE 34) therein and are threaded into aligned tapped holes in plates 472 and 474. Jack screws 490 having lock nuts 491 thereon are threaded through tapped holes in brackets 484 and 486 beneath and in abutment with the bottom edge of each of the plates 472 and 474 to effect this vertical adjustment. The side plates 472 and 474 are fixed to the side plates 124 and 126 (FIGURE 3) of the main machine assembly 122 by brackets 492 (FIGURE 34) which are fixed to the plates 124 and 126 and by draw bolts 494 connected to the brackets 492 and engaging brackets 496 at the front edge of each of the feed mechanism side plates 472 and 474 (FIGURE 32).

The feed mechanism comprises a hopper structure 498 and a transfer arm assembly 500 adapted to transfer substantially straight spring wires 66 in groups from the hopper structure 498 to the throats 94 of the heads 68 when in their position shown in FIGURE 8.

The hopper structures 498 (FIGURE 32) is formed by spaced side wall units 502 and 504 and a plurality of support assemblies 506 upon which the wires 66 rest and which define a channel through which wires 66 are fed laterally seriatim in a single line to the transfer arm assembly 500.

Figure 41:
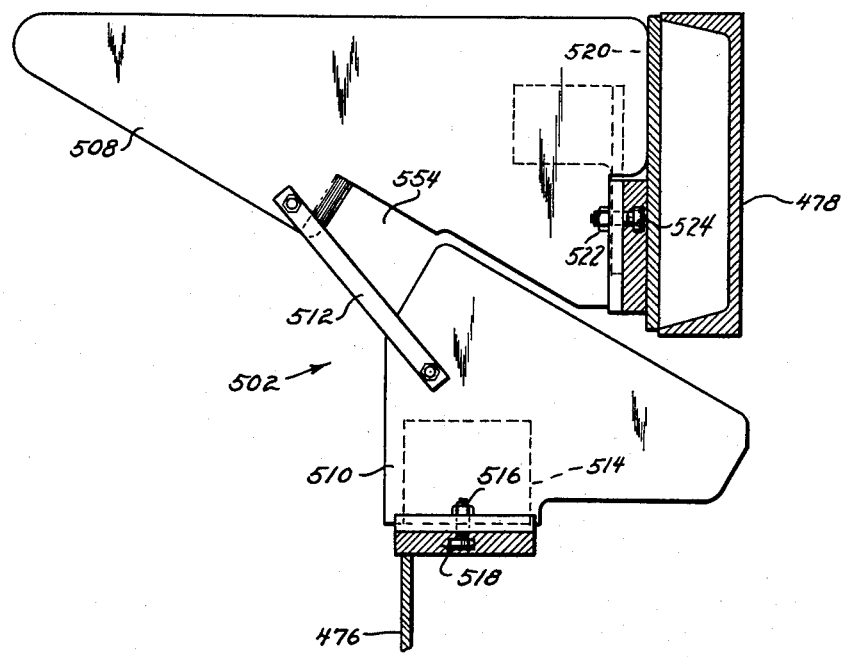
FIGURE 41 is a fragmentary sectional view taken substantially along the line 41—41 of FIGURE 32.

As is best shown in FIGURE 41, the side walls 502 and 504 are formed of an upper plate 508 mounted upon the upper beam 478 and a lower plate 510 mounted upon the lower beam 476, plates 508 and 510 being interconnected by a tie bar 512. Plates 510 are mounted upon beam 476 by brackets 514 (FIGURES 32 and 41) fixed thereto and adjustably fixed to the top surface of the beam 476 by bolts 516, the heads of which are received in an undercut recess 518, extending longitudinally the top of the beam 476. The upper plates 508 are similarly fixed to the upper beams 478 by brackets 520 secured to the front face of beam 478 by bolts 522, the heads of which are received within an undercut recess 524 on the front face of beam 478.

The support structures 506 for the wires 66 are best illustrated in FIGURES 38 and 39. The support structure 506 is formed by a pair of guide bars 528 and 530 having spaced parallel surfaces 532 and 534 respectively which define a downwardly inclined channel 536 through which the spring wires 66 are fed seriatim in a single row by gravity and under the weight of the wires 66 in the hopper 498. The bar 528 is mounted by a support bracket 538, being fixed thereto by spaced bolts 540. Bracket 538 is mounted for adjustment lengthwise of the machine on the beam structure 476, being provided with a mounting flange 542 resting on the top surface of beam 476 and being secured thereto by bolts 544, the heads of which are received in the undercut slot 518 in the top of beam 476. Bar 530 is mounted on the beam 478 by a bracket 546 being secured thereto by space bolts 548. Bracket 546 is fixed to beam structure 478 by bolts 550, the heads of which are received within the undercut slot 524 on the front face of the beam structure 478.

Figure 36:
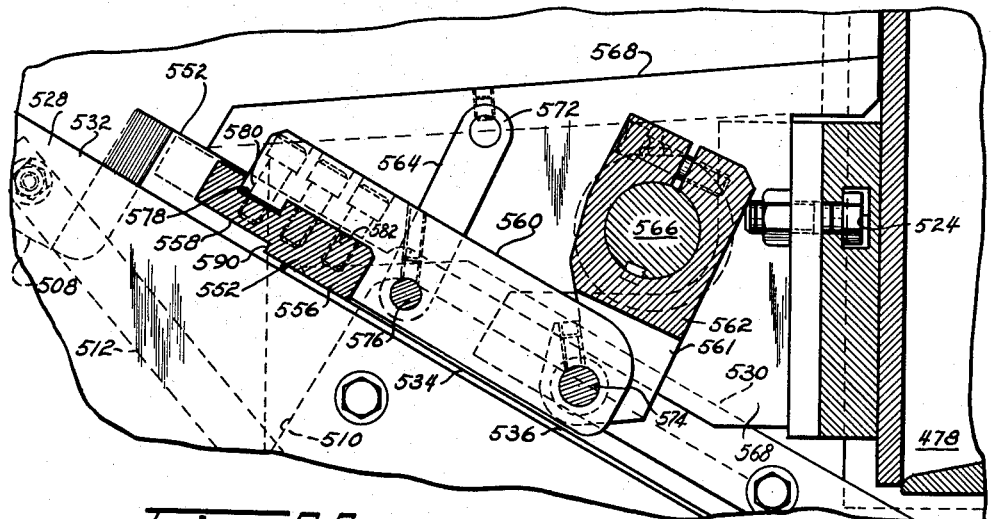
FIGURE 36 is a fragmentary sectional view taken substantially along the line 36—36 of FIGURE 32.

Referring now to FIGURES 32, 33 and 36, the wires 66 in the hopper 498 are jostled into position to feed in a single row through the channel 536 between the surfaces 532 and 534 of the members 528 and 530 by a bunter bar 552 which extends across the feed mechanism through the space 554 (FIGURE 41) defined between the adjacent edges of members 508, 510 and 512 of each of the side plates 502 and 504 in their position as shown in FIGURE 32. The bunter bar 552 is of generally rectangular cross section, the lower face of bar 552 being of stepped construction having a first portion 556 terminating in a bottom face which is parallel to and normally spaced substantially the width of one wire 66 from the surface 532 of the support bar 528 and a second portion 558 terminating in a bottom face which is parallel to and normally spaced from surface 532 a distance substantially equal to twice the diameter of the wires 66. Bar 552 is mounted upon a carrier 560 which is mounted for limited swinging movement upon the arms 561 of a yoke 562 and between a pair of supporting levers 564. The yoke 562 is fixed to a shaft 566 which, as is best shown in FIGURE 32, extends substantially the entire length of the feed mechanism 470 and is journalled on the side plates 472 and 474. Yoke 562 is mounted on shaft 556 between a pair of support plates 568 and 570 through which the shaft 566 extends and in which it is journalled and to which the levers 564 are pivoted by a pivot shaft 572 (FIGURE 36). Support plates 568 are laterally adjustedly mounted on beam 478 by bolts 569, the heads of which are received in undercut recesses 524. The carrier 560 is pivotally mounted between the arms 561 of the yoke 562 by a shaft 574 and between the levers 564 by a shaft 576. The axes of shafts 566, 572, 574 and 576 are all parallel and parallel to surfaces 532 and 534. The top surface of bunter bar 552 is formed with a longitudinally extending groove 578 into which projects a rectangular projection or boss 580 on the underface of the carrier 560 and the underface of the carrier 560 is formed with a cut-out portion 582 into which the bar 552 is received to provide a firm positive seat of the bar 552 on the carrier 560 in parallel relation to the shafts 566, 572, 574 and 576.

The shaft 566 is caused to oscillate by a motor 584 (FIGURE 32) which is coupled to shaft 566 through an eccentric 586 and a link 588 and a lever 589 which is fixed to the end of shaft 566 exteriorly of side frame 472 and which is coupled through link 588 to the eccentric 586 so that rotary movement of the eccentric 586 produces oscillatory movement of the lever 589 and shaft 566.

By this construction, as the shaft 566 is moved in a clockwise direction as viewed in FIGURE 36, the bunter bar 552 is moved upwardly along the inclined surface 532 and pushes any wires 66 in the hopper toward the left as viewed in FIGURE 36. The step 590 between the surfaces 556 and 558 on the undersurface of the bar 552 will push any wires 66 which are not resting flat on the surface 532 to the left as viewed in FIGURE 532 to effect proper alignment thereof parallel to the surface 590 which is parallel to the axis of the shaft 566 and to arrange the wires 66 in a single row of parallel wires resting on the surface 532 to be fed through the channel 536 to the transfer arm assembly 500.

Referring to FIGURE 33, once the wires 66 have been properly aligned by the bunter bar 552 and have passed the bunter bar 552 in their movement through channel 536, they are fed through the channel 536 by gravity under the weight of the remaining bars in the hopper 498. The channel 536 extends toward the main machine frame 122 and terminates in a right angle bend which is directed into the throat 594 of the transfer arm assembly 500 when in its wire receiving position as illustrated in FIGURE 33.

The transfer arm assembly 500 (FIGURES 32, 33, and 35) is shown in its wire receiving position in FIGURE 33 and its wire ejecting position in FIGURE 35 and consists basically of a plate 596 which is fixed for rotation with a shaft 598 and journalled on a pillow block 600 mounted on the rear face of the beam structure 476 by bolts 602, the heads of which are received in an undercut longitudinally extending recess 604 formed along the rear face of the beam structure 476 to permit lateral adjustment of the position of the pillow block 600. Transfer arm assembly plate 596 has an arcuate periphery 606 in which is cut a peripheral radially extending notch defining the wire receiving throat 594. When the assembly 500 is in its wire receiving position (FIGURE 33), the throat 594 is in alignment with the outlet end of the channel 536 and, when it is in its wire discharging position shown in FIGURE 35, the throat 594 is in alignment with the throat 94 of the heads 68 when in their wire receiving position shown in FIGURE 8. The arcuate periphery 606 of the plate 96 forms a gate which supports and prevents discharge of the wires 66 from the open end of channel 536 when the transfer arm assembly 500 is in any position other than its wire receiving position of FIGURE 33.

In order to prevent the wires 36 from falling out of the throat 594 during the movement of the transfer arm assembly 500 between the positions of FIGURE 33 and FIGURE 35, a gate member 608 is pivotally mounted at 610 on the rear face of the plate 596 and is resiliently biased in a clockwise direction as viewed in FIGURE 35 about the pivot 610 by a tension spring 612 connected between spring studs 614 and 616 located on the gate member 608 and the plate 596 respectively. The gate member 608 is formed with a hooked end 618 which is suitably curved so that, when in its closed position as shown in FIGURE 35, it will prevent inadvertent movement of wires 66 from the throat 594 but will be cammed out of the alignment with the throat 594 by the wire 66 when they are forced against the lip of hooked end 618 to permit ejection thereof from the throat 594. As is most clearly shown in FIGURE 39, the gate member 608 is formed with a laterally projecting ear 620 which is located at the end to engage a stud 622 mounted on the support plate 538 when the ransfer arm assembly 500 is moved to its wire receiving position of FIGURE 33. The engagement of ear 620 with the stud 622 effects counterclockwise pivotal movement of the gate 608 about pivot 610 to move its end 618 from alignment with the throat 594 when the transfer arm assembly 500 is moved to its wire receiving position. This removes the obstruction from the throat 594 and permits wires 66 to feed into the throat 594 from the channel 536. On the near face of the plate 596 as viewed in FIGURES 33 and 35, a wire ejector mechanism is mounted. This ejector mechanism comprises a plunger 628 mounted for longitudinal reciprocation in radial alignment with the throat 594 on plate 596 by upper and lower guideways 630 and 632 and is actuated by oscillatory movement of a shaft 634 which extends through and is rotatably mounted relative to plate 596 in spaced parallel relation to the shaft 598 and coupled to the plunger 628 by a linkage comprising a plate 636 fixed to the shaft 634, a plate 638 fixed to the plunger 628 and a link 640 pivotally connected at 642 and 644 to the plates 636 and 638 respectively. The shaft 634 and plate 636 are normally in the positions relative to the plate 596 as shown in FIGURE 33 with the plunger 628 in its retracted position. The configuration of the parts 636, 628 and 638 and 640 relative to the plate 596 is that shown in FIGURE 33 when the transfer arm assembly 500 is in its wire receiving position and remains the same until the transfer arm assembly reaches its wire ejection position shown in FIGURE 35. At that time the shaft 634 is caused to rotate relative to plate 596 in a counter-clockwise direction as viewed in FIGURE 35 to the position shown in FIGURE 35 to effect ejectment of the wires 66 from throat 594 of plate 596 into the throats 94 of heads 68. After completion of the ejection of the wires 66 into the throats 94 of the heads 68, the plunger 628; shaft 634 and the interconnecting links are restored to their position relative to the plate 596, as shown in FIGURE 33, before the counter-clockwise rotation of the transfer arm assembly 500 is back to its wire receiving position shown in FIGURE 33 is initiated. The mechanism by which this movement of these parts is effected will not be described.

Figure 37:
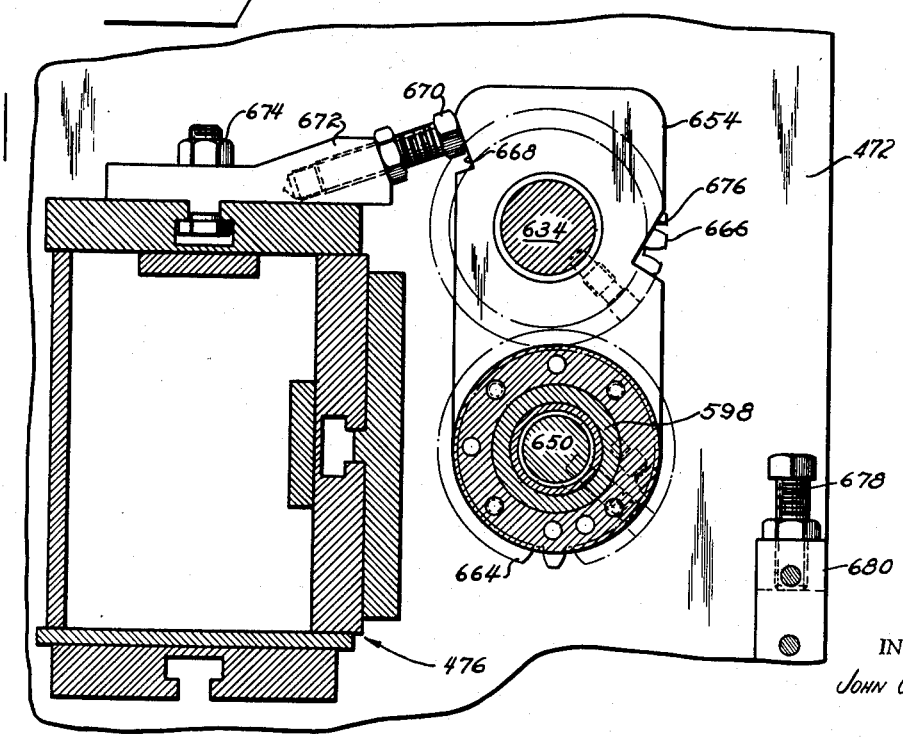
FIGURE 37 is a fragmentary sectional view taken substantially along the line 37—37 of FIGURE 32.

Referring to FIGURES 32 and 37, the shaft 598 extends substantially the full width of the feed mechanism 470 between the side plates 472 and 474 being journalled at its right end in the plate 474 and being journalled upon a coaxially aligned small diameter shaft 650, the adjacent end of which is received in piloting relationship in an end bore 652 of shaft 598, shaft 650 being journalled in the side frame 472. Shaft 634 is journalled in spaced parallel relation to shaft 598 by spaced carriers 654 and 656 at the opposite ends of shaft 598. Carriers 654 and 656 are fixed to shaft 598 and rotate therewith and rotatably mount the eject actuating shaft 634. Stub shaft 650 is connected by a coupling 658 to the output shaft 660 of a hydraulic motor 662 arranged coaxially therewith and mounted on side plate 472 by a support 663. A spur gear 664 is keyed to shaft 650 for rotation therewith intermediate side plate 472 and carrier 654 and is in constant mesh with a gear 666 fixed to the end of shaft 634 to the left of carrier 654 as viewed in FIGURE 32.

Referring now to FIGURE 37, the carriers 654 and 656 are of identical construction to that illustrated in FIGURE 37 and are free to pivot about the axis of shaft 650 and 598 between the vertical position shown in which the notched face 668 abuts a stop screw 670 mounted on a support 672 fixed by a bolt 674 to the top of the lower beam structure 476 and a generally horizontal position in which the notch surface 676 abuts a stop screw 678 mounted on a support bracket 680 fixed to the side walls 472 and 474 respectively.

Referring to FIGURE 40, so long as the carriers 654 are in any position other than the position in which the notch surface 676 abuts the stop screw 678, the shaft 634 and gear 666 are held against rotation relative to the carriers 654 by a cam follower 682 fixed to the extreme right end of the shaft 634 and engaging a fixed cam 684 having a curved cam surface 686 along which the cam follower surface 688 rides during movement of the carriers 654 and 656 toward the stop screw 658. When the carriers 654 and 656 reach their limit position in which notch surface 676 abuts stop screw 678, the trailing edge 690 of the cam follower 682 has passed slightly beyond the edge 692 which forms the intersection of curve surface 686 with a second curve surface 694 on cam 684. In this position, the cam follower 682 and shaft 634 are released for rotation relative to carrier 654 in the counter-clockwise direction as viewed in FIGURES 37 and 40. The engagement between the edge 690 of the cam follower 682 and the cam surface 694 prevents counter-clockwise rotation of the shaft 598 and carrier 654 until the cam follower 682 and shaft 684 have been restored to a clockwise rotation position relative to carrier 654 in which the surface 688 of cam follower 682 clears the surface 686 at edge 692.

From the foregoing description it is apparent that clockwise directed torque (as viewed in FIGURE 37) applied to gear 664 from hydraulic motor 662 (FIGURE 32) will initially effect rotation of the carriers 654 and 656 in a clockwise direction relative to side frames 472 and 474 without producing relative movement between the gears 664 and 666. Once the carriers 654 and 656 reach their limit position against stops 678, the carriers 654 and 656 are restrained from further movement but the shaft 634 and gear 666 are free to rotate in a counter-clockwise direction, which movement is produced by the continuing application of clockwise directed torque applied to gear 664 through shaft 650. Upon reversal of the direction of torque from hydraulic motor 662, the carriers 654 and 656 are restrained against counter-clockwise rotation by the engagement of cam follower surface 690 with the cam surface 694 but the shaft 634 and gear 666 are free to rotate in a clockwise direction to restore the shaft 634 to its initial position relative to carriers 654 and 656. The limit of this clockwise movement of shaft 634 is established by the abutment of a stop screw 696 (FIGURE 35) on the plate 638 for the plunger 628 against a stop 698 mounted on the plate 596 of the transfer arm assembly 500. Continued counter-clockwise direction torque applied to shaft 650 and gear 664 will effect rotation of the carriers 654 and 656 in a counter-clockwise direction into abutment with the stop screws 670 without relative movement between the gears 664 and 666.

The foregoing described movements of shaft 598 under control of the carriers 654 and 656 and of the shaft 634 under control of the cam follower 682 and cam 684 are effective to move the transfer arm plate 596 which is fixed to the shaft 598 in the manner that has been described before and to effect reciprocable movement of the shaft 634 and the wire ejecting plunger 628 when the transfer arm assembly 500 is in its wire ejecting position as has been described before.

Referring to FIGURES 32 and 34, on the extreme left end of the shaft 660 of hydraulic motor 662 is mounted a disc 700 to which is attached a plurality of hydraulic valve actuating cams 702, 704, and 706 coacting respectively with the levers 708, 710 and 712 of hydraulic valves 714, 716 and 718 respectively. When the transfer arm assembly 500 is in its wire receiving position shown in FIGURE 33, the cam 702 engages the valve arm 708 for valve 714. When the transfer arm assembly 500 has been rotated to its position shown in FIGURE 35 and the plunger 628 moved to its eject position as shown in FIGURE 35, the cam 704 engages the lever 710 to actuate the valve 716. The periphery of the cam 706 holds the lever 712 of valve 718 in the position shown in FIGURE 34 so long as the transfer arm assembly 500 and the plate 596 are in a position other than that shown in FIGURE 35, that is the eject position.

As has been indicated throughout the foregoing description of the mechanical components of this machine, the several components of this machine are hydraulically controlled and actuated. The hydraulic circuit for the control of the machine is illustrated in FIGURES 42 to 46 wherein the wire folding head hydraulic motors 158, the head spreading hydraulic motors 366, the ram actuating motors 440 and the spring strip ejection bar actuating motor 326 are illustrated.

Figure 46:
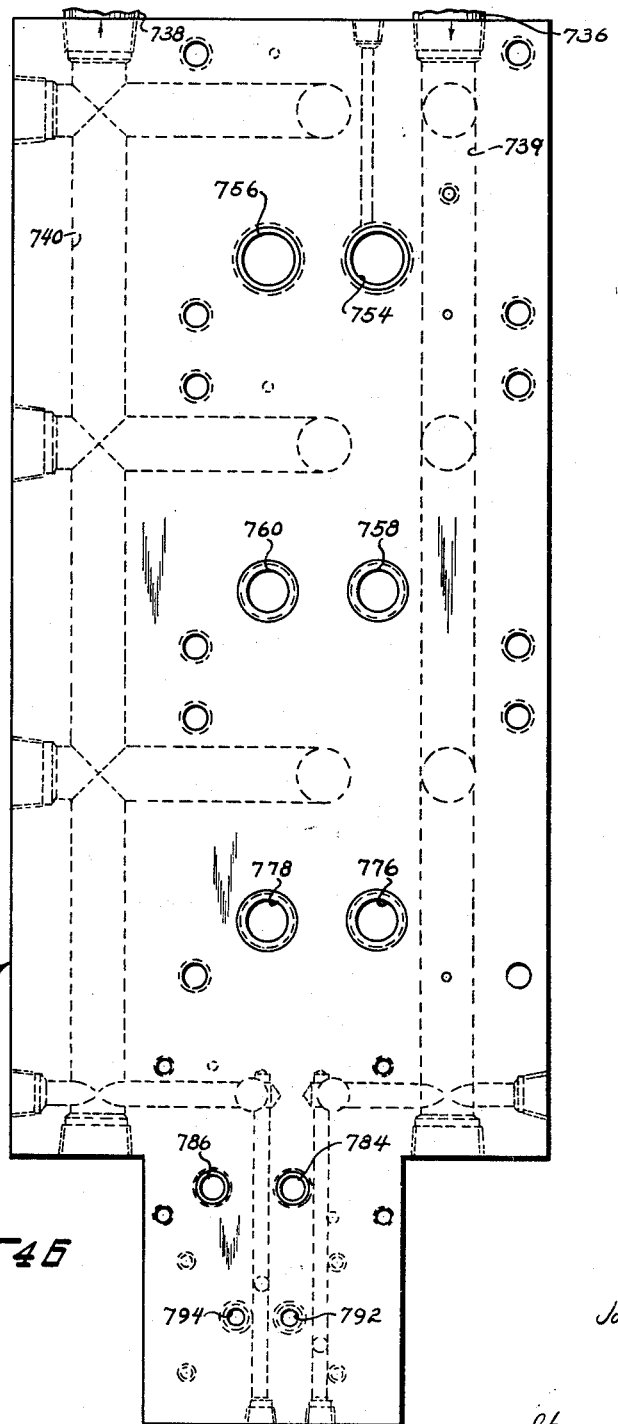
FIGURE 46 is an elevational view of the hydraulic fluid distribution manifold of the hydraulic system of FIGURE 42.

Referring to FIGURE 42, the hydraulic circuit for this machine comprises a hydraulic fluid reservoir tank 722, a pump 724 connected to the reservoir 722 by conduit 726 and driven by an electric motor 728, a manifold 730 connected to the outlet pump 724 by a conduit 732, a distribution manifold 734 connected to the manifold 730 by a conduit 736 and a return line 738 connected to the manifold 734 and extending through a check valve 740 to the reservoir 722. The detailed structure of the manifold 734 is shown in FIGURE 46, it being formed with an inlet passage 738 into which hydraulic fluid is introduced through conduit 736 and the return passage 740 through which hydraulic fluid is returned to the return conduit 738.

The wire folding head hydraulic motors 158 are each connected in parallel to manifold conduits 742 and 744 at the bottom and to manifold conduits 746 and 748 at the top which are connected to T connectors 750 and 752, respectively, of the manifold 734. Port 754 is in fluid communication through T connector 750 with manifold conduits 742 and 748 and port 756 is in fluid communication through T connector 752 with manifold conduits 744 and 746.

Ports 758 and 760 of manifold 734 are in fluid communication through T connectors 762 and 764 and conduits 766 and 768 to the lower ram actuating fluid motor 440 and through conduits 772 and 774 to the upper ram actuating motor 440. Ports 776 and 778 of manifold 734 (FIGURE 46) are in fluid communication through conduits 780 and 782 with the twister head spreader actuating motors 366.

The ports 784 and 786 are in fluid communication through conduits 788 and 790 with the spring strip ejector actuating motor 326.

The ports 792 and 794 are in fluid communication through conduits 796 and 798 with the hydraulic motor 662 (FIGURE 32) of the feed mechanism 470. The distribution of hydraulic fluid through these passages by the manifold and the manifold 734 is effected automatically or manually under control of electrical solenoid valves 800 (FIGURE 3) in accordance with conventional practice, the details of which need not here be described, to effect the sequence of operation of the mechanism in the manner hereinbefore described in detail in the sequence which will now be described.

Controls (not shown) are provided for the machine which permit manual operation. For idle, the hopper wire transfer arm assembly 500 (FIGURE 33) should be up. Outermost spreader arm assemblies 146 and 148 (FIGURE 3) should be outspread. Wire 12 folding and forming heads 68 should be in prewire folding position (FIGURE 8). Ram tools 108 (FIGURE 9) are retracted and knockout heads 156 are back. The proper order of manual operation is:

(1) Start hopper wire transfer assembly 500 (FIGURE 33) down to eject wires 66 into aligned throats 94 of heads 68 (FIGURE 8).

(2) Set heads 68 to grip wires 66 (FIGURE 8).

(3) Return hopper wire transfer assembly 500 (FIGURE 33) to clear hopper ejectors 628 (FIGURE 35) from heads 68.

(4) Finish fold the wires 66 simultaneously bringing in spreader adapted assemblies 146 and 48 (FIGURE 3).

(5) When spreader arm assemblies 146 and 148 are fully in, ram rools 108 may be started down.

(6) Retract ram tools 108.

(7) When ram tools 108 are retracted, actuate the "Spreader Out" control to start the following:

(a) Spreader arm assemblies 146 and 148 and heads 68 start to return to the initial idle position.

(b) As soon as tension is released from finish formed spring strips 60, knockout cylinder 328 (FIGURE 4) starts knockout heads 156 (FIGURES 28 and 30) forward to eject spring strips 60 from heads 68.

(c) When knockout heads 156 are fully forward, a limit switch is actuated to return the knockout heads 156.

(d) Spreader arm assemblies 146 and 148 and heads 68 continue to return to the initial idle positions to complete the cycle.

For automatic operation the pump motor 728 (FIGURES 3 and 42) and shaker motor 584 (FIGURE 32) are started and a selector switch is set for automatic operation. Machine 122 then goes thru its cycle automatically and continues to repeat the cycle. Machine 122 is stopped by setting the selector switch in "Off" position, however, if another cycle has been started, that cycle will be completed before machine 10 stops. An "Emergency Stop" button is provided to stop the machine completely during any portion of the cycle. When the selector switch is placed in "Auto" position machine 122 will run through the portion of each in the following order:

(1) Hopper wire transfer assembly 500 will start down if:

(a) Spreader arm assemblies 146 and 148 are fully outspread.

(b) Knockout heads 156 have completed their return from ejecting spring strips 60 formed in the previous cycle.

(2) When wire transfer assembly 500 reaches its down or eject position wires 66 are inserted into slots 94 of heads 68 and heads 68 are started folding.

(3) Spreader arm assemblies 146 and 148 are, in the meantime, held by hydraulic cylinders 366 in an outspread position. When heads 68 start to fold turn, spreader adapted arm assemblies 146 and 148 are pulled in approximately ½ inch against the force of cylinder 366 at which time the hopper wire transfer assembly 500 ejectors 628 must be returned, in order to clear heads 68 as they continue to fold turn.

(4) When spreader arm assemblies 146 and 148 are pulled in by the folding action of wires 66 as heads 68 are turned, a relay is released and the wire transfer assembly 500 is started back.

(5) As soon as hopper wire ejectors 628 are retracted cylinders 366 are actuated to permit continued inward movement of spreader arm assemblies 146 and 148.

(6) When spreader arm assemblies 146 and 148 reach their innermost position, they each actuate relays to actuate the ram tool relay and hydraulic cylinders 440 for ram tool 108 actuation. Microswitch 458 (FIGURE 7) mounted on linkage assembly 456 stops ram cylinders 440 actuation if excessive ram load is applied.

(7) When ram tools 108 reach the fully actuated position, ram cylinders 440 are reverse actuated to retract ram tools 108. A relay actuated when the ram tools 108 reach the fully actuated position prevents ram tools 108 from being actuated again within the same machine wire spring forming cycle.

(8) When ram tools 108 are retracted after having been actuated, spreader and knockout time delay relays are energized.

(a) Knockout heads 156 start forward only after heads 68 are partially released and spreader arm assemblies 146 and 148 are partially spread so that knockout heads 156 will not distort wire spring strips 60 as they are ejected from machine.

(b) As knockout heads 156 complete their spring strip ejectment stroke, a relay is actuated to reverse actuate hydraulic cylinder 326 to retract heads 156.

(c) When spreader arm assemblies 146 and 148 have returned to fully outspread positions and hydraulic cylinders 158 have returned heads 68 to the prewire folding state (FIGURE 8), machine 122 is ready to repeat its spring forming cyle.

Figure 47:
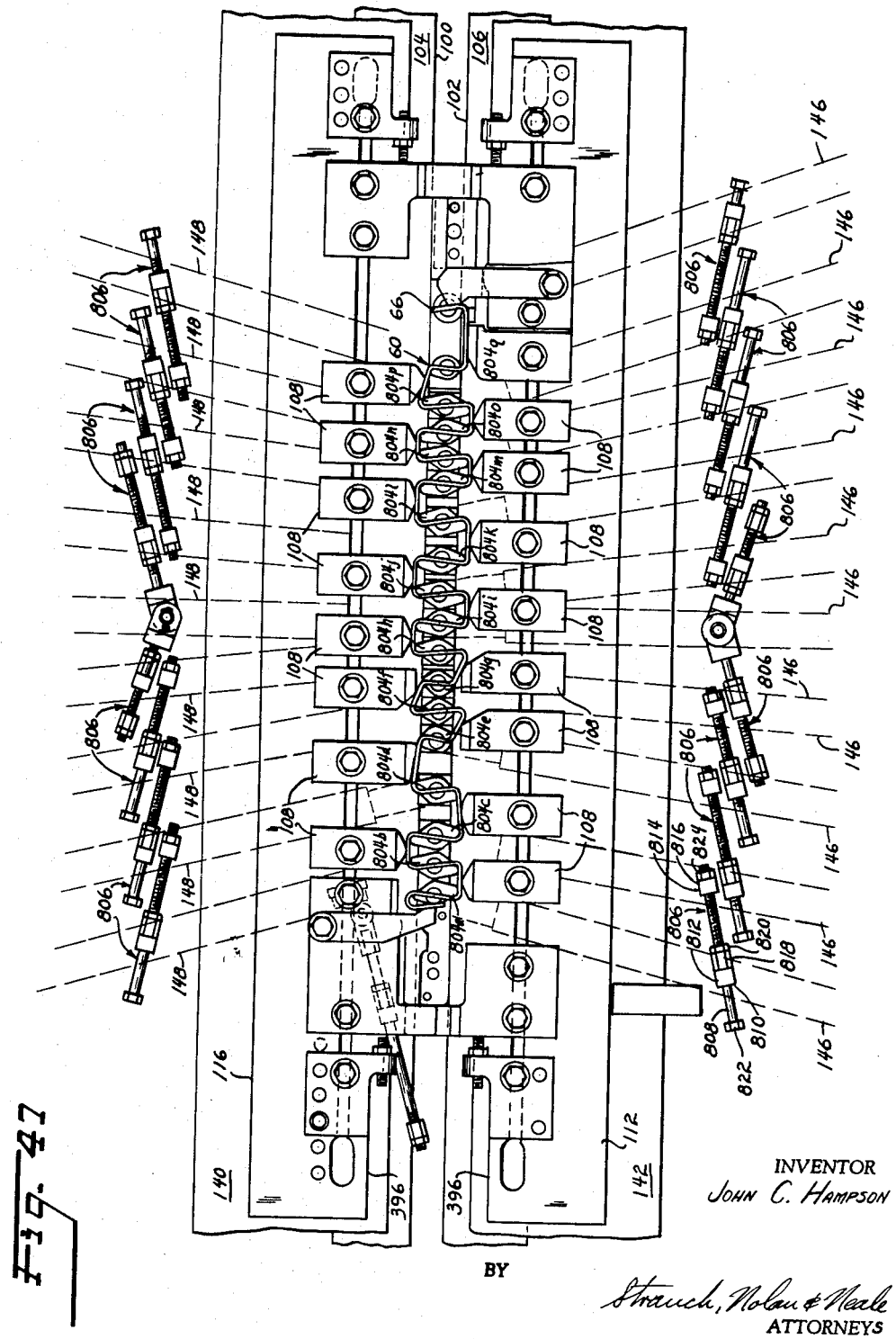
FIGURE 47 is a view similar to FIGURE 9 of a modified form of the invention.

A slightly modified form of the invention is illustrated in FIGURES 47 to 52. Referring to FIGURE 47, the general arrangement, structure and operation of the machine is the same as that illustrated in FIGURES 3 and 8 with the exceptions of the replacement of the heads 68 by heads 804, the omission of the links 70 interconnecting adjacent pairs of the heads 68, and the interconnection of the assemblies 146 and of the assemblies 148 by variable length pull rod assemblies 806. The pull rod assemblies 806 consist of a bolt 808 extending slidably through a bore 810 in a pivot pin 812 on the assemblies 146 and 148, and threadedly received within a tapped hole 814 on a pivot stud 816 on the next adjacent one of the assemblies 146. A pair of lock nuts 818 and 820 threaded on the bolt 808 coact with a head 822 of the bolt 808 to define the limits of sliding movement of the pivot stud 812 relative to the shanks of bolt 808. A lock nut 824 coacts with the pivot stud 816 to prevent relative movement between the bolt 808 and the assembly 146 or 148 to which it is fixed by the pivot stud 814.

When the assemblies 146 and 148 have been brought together to the position as shown in FIGURE 47 by twisting of the heads 808 to form the wire 66 into the spring strip 60, the pivot studs 812 are in abutment with the lock nuts 818. When the assemblies 146 and 148 have been spread apart, corresponding to the position for the prior embodiment shown in FIGURE 8, to receive a straight wire 66 to be formed, the pivot studs 812 are in abutment with the heads 822 of the associated bolts 808. By this construction these variable length pull rod assemblies establish the limit positions of the assemblies 146 and 148 and the lengths of the spacer bars of the finished spring strips. The spacer bar lengths may be varied as desired by adjustment of these pull rod assemblies.

As is clearly illustrated in FIGURES 48 through 58, the heads 804 are of a general configuration similar to that of head 68 of the prior embodiment with the omission of the provision for the interconnection of the heads by links. The heads 804 comprise a base portion 826 through which is formed a bore 828 having axially extending splines formed therein and from which projects a pair of spaced anvils 830 and 832 having respectively spaced parallel surfaces 834 and 836 which define a throat 838 into which the straight wires are inserted prior to the twisting of the heads 804 and from which the spring strip is ejected after twisting of the heads 804 and operation of the hammers 108.

Figure 48:
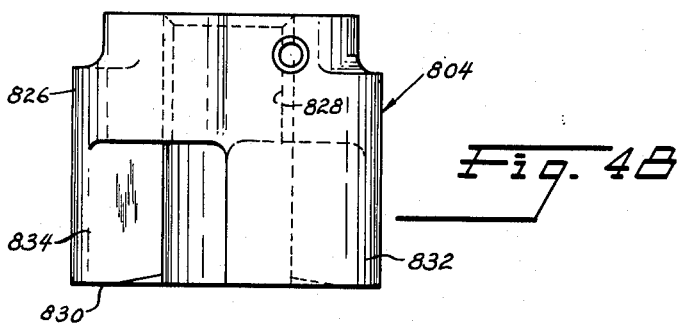
FIGURES 48, 49 and 50 are respectively a top, front and right side view of one form of forming head utilized in the mechanism of FIGURE 47.
Figure 49:
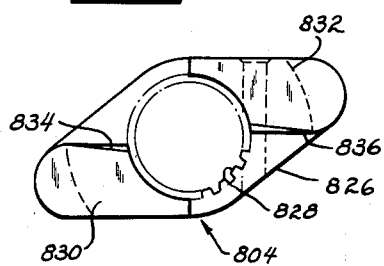
Figure 50:
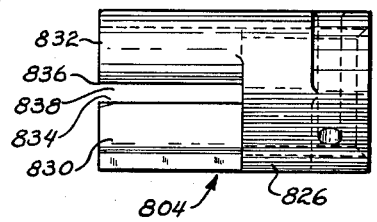
Figure 51:
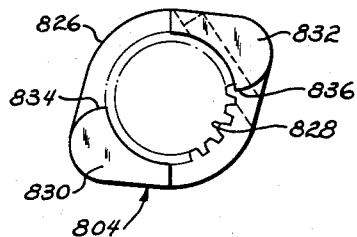
FIGURES 51 and 52 are respectively a front and right side view of a second form of forming head utilized in the mechanism of FIGURE 47.
Figure 52:
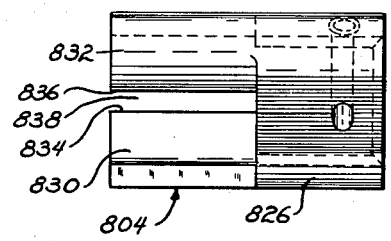
Figure 53:
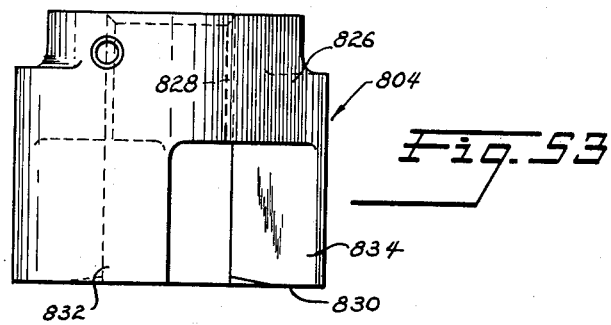
FIGURES 53, 54 and 55 are respectively a front and right side view of a third form of forming head utilized in the mechanism of FIGURE 47.
Figure 54:
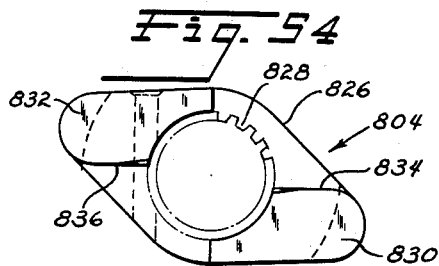
Figure 55:
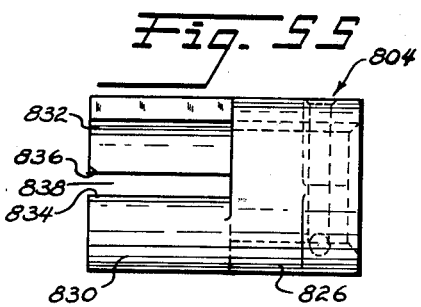
Figure 56:
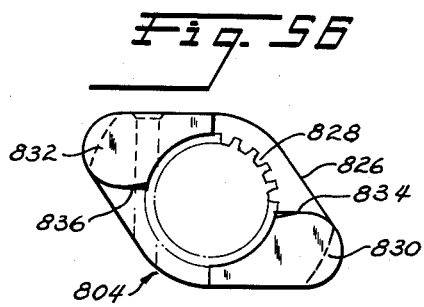
FIGURES 56, 57 and 58 are respectively a front, right side and top view of a fourth form of forming head utilized in the mechanism of FIGURE 47.
Figure 57:
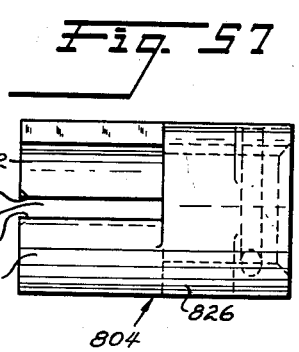
Figure 58:
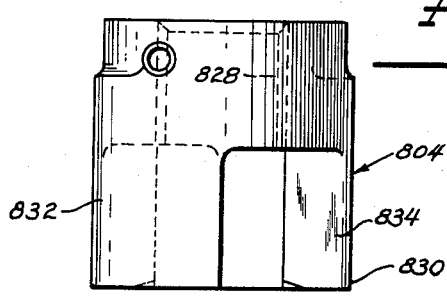

Reading from left to right in FIGURE 47, head 804 is shown in FIGURES 53 to 55, 804c is a symmetrical opposite of the head shown in FIGURES 53 to 55, head 804d is shown in FIGURES 56 to 58, head 804e is shown in FIGURES 51 and 52, head 804f is shown in FIGURES 53 to 55, head 804g in FIGURES 51 and 52, head 804h in FIGURES 53 to 55, head 804i is a symmetrical opposite of that shown in FIGURES 53 to 55, head 804j is shown in FIGURES 53 to 55, head 804k is a symmetrical opposite of that shown in FIGURES 53 to 55, head 804l is that shown in FIGURES 53 to 55, head 804m is that shown in FIGURES 48 to 50, head 804n is the symmetrical opposite of that shown in FIGURES 48 to 50, head 804o is that shown in FIGURES 48 to 50, head 804p is a symmetrical opposite of that shown in FIGURES 48 to 50 and head 804q is that shown in FIGURES 51 and 52.

With these exceptions, this second embodiment of the machine is identical with the first embodiment.

From the foregoing it is apparent that there is hereby provided new improved wire forming machines which employ a new improved method for forming seat springs of the intermittent sinuous multiple torsion bar and spacer bar type of acceptable wire tolerance diameter. It provides individually hydraulic actuated wire folding heads, each of which simultaneously forms two folds in each wire of multiple wires being simultaneously formed into springs with multiple torsion and spacer bars. Ram tools are provided which are effective to finish from the spring bends about the anvil portions of wire folding heads and straighten the spacer bars of the springs to provide the necessary slackness for free stripping and ejection of finished springs. It provides a finished wire seat spring strip with substantially uniform wire diameter throughout the irregularly shaped spring. It provides in one embodiment links between wire folding heads and in another embodiment links between folding head mounting arm assemblies instead of links between the folding heads. It provides a double fulcrum pivot mount at the base of folding head mounting arm assemblies. In both embodiments folding head pinion drive rack limit adjustments means are provided on each arm assembly which are accessible from the rear of the machine.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. A method of forming a sinuous spring strip in which alternate successive segments are torsion bars and spacer bars from a substantially straight wire of pre-determined length substantially equal to the wire length of the finished spring strip comprising the steps of restraining a plurality of successive spaced portions of said wire equal in length to the successive torsion bars of said spring strip, each adjacent pair of said restrained wire portions being spaced apart along such wire a distance equal to the length of the spacer bar of said spring strip between the torsion bars to which such pair of restrained portions correspond, the portions of said strip between said restrained portions being unsupported and simultaneously folding alternate ones of said restrained portions in opposite directions in a common plane into substantially mutually parallel relation and more closely longitudinally congregating said restrained portions to maintain said wire substantially free of tension said unsupported portions of said wire strip being shifted laterally of the axis of said wire strip without substantial deformation while said restrained portions are folded.

2. A method of forming a sinuous spring strip in which alternate successive segments are torsion bars and spacer bars from a substantially straight wire of pre-determined length substantially equal to the wire length of the finished spring strip comprising the steps of restraining a plurality of successive spaced portions of said wire equal in length to the successive torsion bars of said spring strip, each adjacent pair of said restrained wire portions being spaced apart along said wire a distance equal to the length of the spacer bar of said spring strip between the torsion bars to which such pair of restrained portions correspond, simultaneously folding alternate ones of said restrained portions in opposite directions in a common plane into substantially mutually parallel relation and more closely longitudinally congregating said restrained portions to maintain said wire substantially free of tension, and subsequently applying a wire forming force to the exterior side of each unrestrained portion of said wire to permanently set said wire in its folded configuration, said force being directed substantially parallel to said folded restrained portions in said plane.

3. A method of forming a sinuous spring strip in which alternate successive segments are torsion bars and spacer bars from a substantially straight wire of pre-determined length substantially equal to the wire length of the finished spring strip comprising the steps of restraining a plurality of successive spaced portions of said wire equal in length to the successive torsion bars of the spring strip to be formed, each adjacent pair of said restrained wire portions being spaced apart along said wire a distance equal to the length of the spacer bar of said spring strip between the torsion bars to which such pair of restrained portions correspond, the portions of said wire strip between said restrained portions being unsupported and free for lateral shifting movement and simultaneously positively rotating alternate ones of said restrained portions in opposite directions about parallel axes lying in a common plane which includes said wire into substantially mutually parallel relation and more closely longitudinally congregating said restrained portion rotation axes in said plane to maintain said wire substantially free of tension said unsupported portions of said wire strip being shifted laterally of the axis of said wire strip without substantial deformation during the rotation of said restrained portions.

4. A method of forming a sinuous strip in which alternate successive segments are torsion bars and spacer bars from a susbtantially straight wire of pre-determined length substantially equal to the wire length of the finished spring strip comprising the steps of restraining a plurality of successive spaced portions of said wire equal in length to the successive torsion bars of the spring strip to be formed, each adjacent pair of said restrained wire portions being spaced apart along said wire a distance equal to the length of the spacer bars of said spring strip between the torsion bars to which such pair of restrained portions correspond, simultaneously rotating alternate ones of said restrained portions in opposite directions about parallel axes lying in a common plane which includes said wire into substantially mutually parallel relation and more closely longitudinally congregating said restrained portions rotation axes in said plane to maintain said wire substantially free of tension, and applying a force to the exterior side of each unrestrained portion of said wire after said restrained portions have been rotated to permanently set said wire in its folded configuration, said force being directed parallel to said folded restrained portions in said plane.

5. A method for simultaneously forming multiple torsion bar and spacer bar sinuous form springs from precut straight wires consisting of: inserting precut straight wires into wire folding heads, simultaneously rotating each wire folding head to fold the wires into a sinuous form with multiple torsion bars and spacer bars and then straightening the spacer bars with ram tools to allow free stripping and ejection of the springs from the wire folding heads and finally ejecting the finished springs from said wire folding heads.

6. A method of forming a sinuous wire spring strip from a susbtantially straight length of wire which comprises the steps of gripping said wire at and along spaced regions along its length, relatively turning said gripped regions until they are parallel and extending transversely of the original wire length with bent longitudinally extending portions interconnecting the alternate ends of said parallel regions, and then forcibly permanently straightening said bent portions while said spaced regions are held in parallel relation so that said spaced wire regions will remain parallel when the formed wire strip is released.

7. A method of forming a sinuous wire spring strip from a substantially straight length of wire which comprises the steps of gripping said wire at and along spaced regions along its length, oppositely turning adjacent gripped regions until they are parallel and extend transversely to the original length of said wire with bent longitudinally extending portions interconnecting the alternate ends of said parallel regions, and then laterally hammering said bent portions while said spaced regions are held in parallel relation sufficiently to permanently straighten said bent portions so that said spaced wire regions will remain parallel when the formed wire strip is released.

References Cited by the Examiner
UNITED STATES PATENTS

| 2,086,736 | 7/37 | Palmer | 153—20 |
| 2,702,576 | 2/55 | Eidal | 153—20 |
| 2,744,546 | 5/56 | Williams | 140—71 |
| 2,815,062 | 12/57 | Cook et al. | 153—20 |

CHARLES W. LANHAM, *Primary Examiner.*
KINGSLEY C. PECK, *Examiner.*